(12) United States Patent
Matson et al.

(10) Patent No.: US 12,322,280 B2
(45) Date of Patent: *Jun. 3, 2025

(54) POWER TOOL PROFILE SHARING AND PERMISSIONS

(71) Applicant: Milwaukee Electric Tool Corporation, Brookfield, WI (US)

(72) Inventors: Stephen Matson, Milwaukee, WI (US); Christian Coulis, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/820,726

(22) Filed: Aug. 18, 2022

(65) Prior Publication Data

US 2023/0049646 A1 Feb. 16, 2023

Related U.S. Application Data

(63) Continuation of application No. 16/453,618, filed on Jun. 26, 2019, now Pat. No. 11,423,768, which is a
(Continued)

(51) Int. Cl.
*G08C 17/02* (2006.01)
*H04L 67/306* (2022.01)

(52) U.S. Cl.
CPC ............ *G08C 17/02* (2013.01); *H04L 67/306* (2013.01)

(58) Field of Classification Search
CPC ..... G08C 17/02; H04L 63/102; H04L 63/108; H04L 67/306; H04L 67/125; B25F 1/00;
(Continued)

(56) References Cited

U.S. PATENT DOCUMENTS 3,882,305 A 5/1975 Johnstone
4,545,106 A 10/1985 Juengel
(Continued)

FOREIGN PATENT DOCUMENTS

CN 203673522 U 6/2014
CN 105467865 A 4/2016
(Continued)

OTHER PUBLICATIONS

Shrinivasa et al., "A Detailed Elucidation on Surface Sensing Hand Power Drill," International Journal of Mechanical Handling and Automation, 2019, 5(2): pp. 1-7.
(Continued)

*Primary Examiner* — Greg C Bengzon
(74) *Attorney, Agent, or Firm* — Michael Best & Friedrich LLP

(57) ABSTRACT

Method and system for programming a power tool from an external device. The method includes establishing a first communication link with a server. The server includes a profile bank that includes mode profiles generated by a plurality of users. The method further includes receiving, over the first communication link, a list of mode profiles representing a subset of the mode profiles of the profile bank. The method further includes receiving, in response to user input from a first user on the external device, a selection of a mode profile. The method further includes transmitting, over the first communication link, the selection of the mode profile. The method further includes receiving, over the first communication link, the mode profile, the mode profile having been generated by a second user. The method further includes transmitting wirelessly, to the power tool, the mode profile to configure the power tool.

18 Claims, 20 Drawing Sheets

Related U.S. Application Data continuation of application No. 15/183,914, filed on Jun. 16, 2016, now Pat. No. 10,380,883.

(60) Provisional application No. 62/180,592, filed on Jun. 16, 2015.

(58) Field of Classification Search
CPC .. B25F 1/003; B25F 1/006; B25F 1/02; B25F 3/00; B25F 5/00; G05B 15/02; G05B 19/04; G05B 19/41835; G05B 19/41845; G05B 19/4185; G05B 19/4187; G05B 19/41885; G06F 3/04817; G06F 3/0482; G06F 3/04842; G06F 3/04847
See application file for complete search history.

(56) References Cited

U.S. PATENT DOCUMENTS

| | | | |
|---|---|---|---|
| 4,680,862 A | 7/1987 | Wieland et al. | |
| 4,685,050 A | 8/1987 | Polzer et al. | |
| 4,854,786 A | 8/1989 | Alexander et al. | |
| 5,277,261 A | 1/1994 | Sakoh | |
| 5,315,501 A | 5/1994 | Whitehouse | |
| 5,592,396 A | 1/1997 | Tambini et al. | |
| 5,903,462 A | 5/1999 | Wagner et al. | |
| 5,942,975 A | 8/1999 | Sørensen | |
| 6,005,489 A | 12/1999 | Siegle et al. | |
| 6,055,484 A | 4/2000 | Lysaght | |
| 6,123,241 A | 9/2000 | Walter et al. | |
| 6,157,313 A | 12/2000 | Emmermann | |
| 6,161,629 A | 12/2000 | Hohmann et al. | |
| 6,279,668 B1 | 8/2001 | Mercer | |
| 6,349,266 B1 | 2/2002 | Lysaght et al. | |
| 6,390,205 B2 | 5/2002 | Wallgren et al. | |
| 6,405,598 B1 | 6/2002 | Bareggi | |
| 6,424,799 B1 | 7/2002 | Gilmore | |
| 6,431,425 B1 | 8/2002 | Moorman et al. | |
| 6,469,615 B1 | 10/2002 | Kady et al. | |
| 6,508,313 B1 | 1/2003 | Carney et al. | |
| 6,510,350 B1 * | 1/2003 | Steen, III | G05B 15/02 |
| | | | 702/188 |
| 6,520,270 B2 | 2/2003 | Wissmach et al. | |
| 6,522,949 B1 | 2/2003 | Ikeda et al. | |
| 6,598,684 B2 | 7/2003 | Natanabe | |
| 6,668,212 B2 | 12/2003 | Colangelo, II et al. | |
| 6,675,196 B1 | 1/2004 | Kronz | |
| 6,768,994 B1 | 1/2004 | Howard et al. | |
| 6,687,567 B2 | 2/2004 | Watanabe | |
| 6,784,801 B2 | 8/2004 | Watanabe et al. | |
| 6,836,614 B2 | 12/2004 | Gilmore | |
| 6,848,516 B2 | 2/2005 | Giardino | |
| 6,872,121 B2 | 3/2005 | Wiener et al. | |
| 6,913,087 B1 | 7/2005 | Brotto et al. | |
| 6,923,285 B1 | 8/2005 | Rossow et al. | |
| 6,938,689 B2 | 9/2005 | Farrant et al. | |
| 6,954,048 B2 | 10/2005 | Cho | |
| 6,968,908 B2 | 11/2005 | Tokunaga et al. | |
| 6,981,311 B2 | 1/2006 | Seith et al. | |
| 6,989,749 B2 | 1/2006 | Mohr | |
| 6,992,585 B2 | 1/2006 | Saleh et al. | |
| 7,034,711 B2 | 4/2006 | Sakatani et al. | |
| 7,035,710 B2 | 4/2006 | Balling | |
| 7,035,898 B1 | 4/2006 | Baker | |
| 7,036,703 B2 | 5/2006 | Grazioli et al. | |
| 7,062,998 B2 | 6/2006 | Hohmann et al. | |
| 7,064,502 B2 | 6/2006 | Garcia et al. | |
| 7,086,483 B2 | 8/2006 | Arimura et al. | |
| 7,102,303 B2 | 9/2006 | Brotto et al. | |
| 7,112,934 B2 | 9/2006 | Gilmore | |
| 7,123,149 B2 | 10/2006 | Nowak et al. | |
| 7,137,541 B2 | 11/2006 | Baskar et al. | |
| 7,211,972 B2 | 5/2007 | Garcia et al. | |
| 7,218,227 B2 | 5/2007 | Davis et al. | |
| 7,243,440 B2 | 7/2007 | DeKeyser | |
| 7,298,240 B2 | 11/2007 | Lamar | |
| 7,319,395 B2 | 1/2008 | Puzio et al. | |
| 7,322,503 B2 | 1/2008 | Odoni et al. | |
| 7,391,326 B2 | 1/2008 | Puzio et al. | |
| 7,328,086 B2 | 2/2008 | Perry et al. | |
| 7,328,757 B2 | 2/2008 | Davies | |
| 7,330,129 B2 | 2/2008 | Crowell et al. | |
| 7,336,181 B2 | 2/2008 | Nowak et al. | |
| 7,339,477 B2 | 3/2008 | Puzio et al. | |
| 7,343,764 B2 | 3/2008 | Solfronk | |
| 7,346,406 B2 | 3/2008 | Brotto et al. | |
| 7,346,422 B2 | 3/2008 | Tsuchiya et al. | |
| 7,359,762 B2 | 4/2008 | Etter et al. | |
| 7,382,272 B2 | 6/2008 | Feight | |
| 7,383,882 B2 | 6/2008 | Lerche et al. | |
| 7,437,204 B2 | 10/2008 | Lev-Ami et al. | |
| 7,464,769 B2 | 12/2008 | Nakazawa et al. | |
| 7,501,778 B2 | 3/2009 | Hashimoto et al. | |
| 7,540,334 B2 | 6/2009 | Gass et al. | |
| 7,613,590 B2 * | 11/2009 | Brown | A61B 5/6896 |
| | | | 702/104 |
| 7,646,155 B2 | 1/2010 | Woods et al. | |
| 7,649,464 B2 | 1/2010 | Puzio et al. | |
| RE41,185 E | 3/2010 | Gilmore et al. | |
| 7,690,569 B2 | 4/2010 | Swanson et al. | |
| 7,750,811 B2 | 7/2010 | Puzio et al. | |
| 7,772,850 B2 | 8/2010 | Bertness | |
| 7,784,104 B2 | 8/2010 | Innami et al. | |
| 7,787,981 B2 | 8/2010 | Austin et al. | |
| 7,795,829 B2 | 9/2010 | Seiler et al. | |
| 7,809,495 B2 | 10/2010 | Leufen | |
| 7,817,062 B1 | 10/2010 | Li et al. | |
| 7,834,566 B2 | 11/2010 | Woods et al. | |
| 7,850,071 B2 | 12/2010 | Sakamoto et al. | |
| 7,868,591 B2 | 1/2011 | Phillips et al. | |
| 7,898,403 B2 | 3/2011 | Ritter et al. | |
| 7,900,524 B2 | 3/2011 | Calloway et al. | |
| 7,911,379 B2 | 3/2011 | Cameron | |
| 7,928,673 B2 | 4/2011 | Woods et al. | |
| 7,928,845 B1 | 4/2011 | LaRosa | |
| 7,931,096 B2 | 4/2011 | Saha | |
| 7,942,084 B2 | 5/2011 | Wilson, Jr. et al. | |
| 7,942,211 B2 | 5/2011 | Scrimshaw et al. | |
| 7,953,965 B2 | 5/2011 | Qin et al. | |
| 7,982,624 B2 | 7/2011 | Richter et al. | |
| 8,004,397 B2 | 8/2011 | Forrest et al. | |
| 8,004,664 B2 | 8/2011 | Etter et al. | |
| 8,005,647 B2 | 8/2011 | Armstrong et al. | |
| 8,044,796 B1 | 10/2011 | Carr, Sr. | |
| 8,049,636 B2 | 11/2011 | Buckingham et al. | |
| 8,082,181 B2 | 12/2011 | Panasik | |
| 8,161,613 B2 | 4/2012 | Schuele et al. | |
| 8,169,298 B2 | 5/2012 | Wiesner et al. | |
| 8,171,828 B2 | 5/2012 | Duvan et al. | |
| 8,210,275 B2 | 7/2012 | Suzuki et al. | |
| 8,255,358 B2 | 8/2012 | Ballew et al. | |
| 8,260,452 B2 | 9/2012 | Austin et al. | |
| 8,264,374 B2 | 9/2012 | Obatake et al. | |
| 8,281,871 B2 | 10/2012 | Cutler et al. | |
| 8,286,723 B2 | 10/2012 | Puzio et al. | |
| 8,294,424 B2 | 10/2012 | Bucur | |
| 8,306,836 B2 | 11/2012 | Nichols et al. | |
| 8,310,206 B2 | 11/2012 | Bucur | |
| 8,316,958 B2 | 11/2012 | Schell et al. | |
| 8,330,426 B2 | 12/2012 | Suzuki et al. | |
| 8,344,879 B2 | 1/2013 | Harmon et al. | |
| 8,351,982 B2 | 1/2013 | Rofougaran | |
| 8,406,697 B2 | 3/2013 | Arimura et al. | |
| 8,412,179 B2 | 4/2013 | Gerold et al. | |
| 8,438,955 B2 | 5/2013 | Wilson, Jr. et al. | |
| 8,464,808 B2 | 6/2013 | Leü | |
| 8,485,049 B2 | 7/2013 | Yokoyama et al. | |
| 8,504,008 B1 * | 8/2013 | Gossweiler, III | |
| | | | H04M 1/72415 |
| | | | 455/420 |
| 8,576,095 B2 | 11/2013 | Harmon et al. | |
| 8,600,932 B2 | 12/2013 | Poling et al. | |
| 8,611,250 B2 | 12/2013 | Chen et al. | |
| 8,645,176 B2 | 2/2014 | Walton et al. | |
| 8,657,482 B2 | 2/2014 | Malackowski et al. | |

(56) References Cited

U.S. PATENT DOCUMENTS

| | | |
|---|---|---|
| 8,666,936 B2 | 3/2014 | Wallace |
| 8,678,106 B2 | 3/2014 | Matsunaga et al. |
| 8,818,617 B2 | 8/2014 | Miller et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,954,222 B2 | 2/2015 | Costantino |
| 8,954,227 B2 | 2/2015 | Bertosa et al. |
| 8,965,841 B2 | 2/2015 | Wallace |
| 8,972,291 B2 | 3/2015 | Rimnac et al. |
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,041,561 B2 | 5/2015 | Wallace et al. |
| 9,043,402 B2 | 5/2015 | Fosburgh et al. |
| 9,061,392 B2 | 6/2015 | Forgues et al. |
| 9,094,793 B2 | 7/2015 | Kusakari et al. |
| 9,111,234 B2 | 8/2015 | Wallace et al. |
| 9,126,317 B2 | 9/2015 | Lawton et al. |
| 9,144,875 B2 | 9/2015 | Schlesak et al. |
| 9,194,917 B2 | 11/2015 | Brochhaus |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,256,988 B2 | 2/2016 | Wenger et al. |
| 9,281,770 B2 | 3/2016 | Wood et al. |
| 9,298,803 B2 | 3/2016 | Wallace |
| 9,367,062 B2 | 6/2016 | Volpert |
| 9,513,785 B2 * | 12/2016 | Bump ............ G05B 19/41845 |
| 9,878,432 B2 * | 1/2018 | Linehan ................ B25F 5/00 |
| 11,423,768 B2 * | 8/2022 | Matson ................ H04L 67/306 |
| 2001/0052416 A1 | 12/2001 | Wissmach et al. |
| 2002/0026514 A1 * | 2/2002 | Ellis ................ G05B 19/41865 |
| | | 709/227 |
| 2002/0033267 A1 | 3/2002 | Schweizer et al. |
| 2003/0121677 A1 | 7/2003 | Watanabe et al. |
| 2004/0054923 A1 | 3/2004 | Seago et al. |
| 2004/0182587 A1 | 9/2004 | May et al. |
| 2005/0035659 A1 | 2/2005 | Hahn et al. |
| 2005/0060243 A1 | 3/2005 | Whetman et al. |
| 2005/0164704 A1 | 7/2005 | Winsor |
| 2006/0009879 A1 | 1/2006 | Lynch et al. |
| 2006/0076385 A1 | 4/2006 | Etter et al. |
| 2006/0106482 A1 * | 5/2006 | Etter ................ B23D 59/008 |
| | | 83/522.11 |
| 2006/0116787 A1 * | 6/2006 | Etter ................ B23D 59/002 |
| | | 700/160 |
| 2006/0142894 A1 * | 6/2006 | Tsuchiya ................ B25F 5/00 |
| | | 700/179 |
| 2006/0155582 A1 * | 7/2006 | Brown ................ A61B 5/0002 |
| | | 600/300 |
| 2006/0259500 A1 * | 11/2006 | Hood ................ G05B 19/056 |
| 2007/0252675 A1 | 11/2007 | Lamar |
| 2008/0084334 A1 | 4/2008 | Ballew |
| 2008/0086320 A1 | 4/2008 | Ballew et al. |
| 2008/0086323 A1 | 4/2008 | Petrie et al. |
| 2008/0086349 A1 | 4/2008 | Petrie |
| 2008/0086391 A1 | 4/2008 | Maynard et al. |
| 2008/0086427 A1 | 4/2008 | Wallace |
| 2008/0086428 A1 | 4/2008 | Wallace |
| 2008/0086685 A1 | 4/2008 | Janky et al. |
| 2008/0252446 A1 | 10/2008 | Dammertz |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0071042 A1 | 3/2010 | Hochmuth et al. |
| 2010/0085008 A1 | 4/2010 | Suzuki et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2011/0056716 A1 | 3/2011 | Jönsson et al. |
| 2011/0063093 A1 | 3/2011 | Fung et al. |
| 2011/0067895 A1 | 3/2011 | Nobe et al. |
| 2011/0073343 A1 | 3/2011 | Sawano et al. |
| 2011/0162858 A1 | 7/2011 | Coste |
| 2011/0309931 A1 | 12/2011 | Rose |
| 2012/0019177 A1 | 1/2012 | Kaufmann et al. |
| 2012/0046070 A1 | 2/2012 | Shin |
| 2012/0111589 A1 | 5/2012 | Schmidt et al. |
| 2012/0167721 A1 | 7/2012 | Fluhrer |
| 2012/0168189 A1 | 7/2012 | Eckert |
| 2012/0169485 A1 | 7/2012 | Eckert |
| 2012/0267134 A1 | 10/2012 | Matthias et al. |
| 2012/0292070 A1 | 11/2012 | Ito et al. |
| 2012/0325507 A1 | 12/2012 | Fluhrer et al. |
| 2013/0024245 A1 | 1/2013 | Nichols et al. |
| 2013/0062086 A1 | 3/2013 | Ito et al. |
| 2013/0071815 A1 | 3/2013 | Hudson et al. |
| 2013/0087355 A1 | 4/2013 | Domori et al. |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2013/0304903 A1 | 11/2013 | Mick et al. |
| 2013/0327552 A1 | 12/2013 | Lovelass et al. |
| 2013/0346183 A1 * | 12/2013 | Chandra ................ G06Q 30/02 |
| | | 705/14.41 |
| 2013/0346545 A1 * | 12/2013 | Petersen ............ G06F 16/9538 |
| | | 709/217 |
| 2014/0006295 A1 | 1/2014 | Zeiler et al. |
| 2014/0052384 A1 | 2/2014 | Poling et al. |
| 2014/0069672 A1 * | 3/2014 | Mashiko ................ B25B 21/00 |
| | | 173/47 |
| 2014/0070924 A1 | 3/2014 | Wenger et al. |
| 2014/0107853 A1 * | 4/2014 | Ashinghurst ............ B25F 5/00 |
| | | 700/297 |
| 2014/0115003 A1 | 4/2014 | Paymal et al. |
| 2014/0122143 A1 | 5/2014 | Fletcher et al. |
| 2014/0149416 A1 | 5/2014 | Wallace |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0180464 A1 | 6/2014 | Koerber |
| 2014/0184397 A1 | 7/2014 | Volpert |
| 2014/0258445 A1 | 9/2014 | McCoy et al. |
| 2014/0266024 A1 | 9/2014 | Chinnadurai et al. |
| 2014/0279290 A1 | 9/2014 | Rimnac et al. |
| 2014/0284070 A1 | 9/2014 | Ng et al. |
| 2014/0292245 A1 | 10/2014 | Suzuki et al. |
| 2014/0316837 A1 | 10/2014 | Fosburgh et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 * | 11/2014 | Li ........................... G05B 15/02 |
| | | 700/103 |
| 2014/0336955 A1 | 11/2014 | Li et al. |
| 2014/0349269 A1 * | 11/2014 | Canoy .................... G06N 20/00 |
| | | 434/322 |
| 2014/0350716 A1 | 11/2014 | Fly et al. |
| 2014/0351182 A1 * | 11/2014 | Canoy .................... G06N 20/00 |
| | | 706/12 |
| 2014/0365259 A1 | 12/2014 | Delplace et al. |
| 2014/0367134 A1 | 12/2014 | Phillip et al. |
| 2014/0379136 A1 | 12/2014 | Schlegel et al. |
| 2015/0000944 A1 | 1/2015 | Duesselberg et al. |

(56) References Cited

U.S. PATENT DOCUMENTS

| | | |
|---|---|---|
| 2015/0002089 A1 | 1/2015 | Rejman et al. |
| 2015/0019987 A1* | 1/2015 | Kouda ............... H04L 67/02 715/744 |
| 2015/0042247 A1 | 2/2015 | Kusakawa |
| 2015/0084745 A1 | 3/2015 | Hertz et al. |
| 2015/0122524 A1 | 5/2015 | Papp |
| 2015/0127205 A1 | 5/2015 | Brochhaus |
| 2015/0135306 A1* | 5/2015 | Winkler ............... G06F 12/00 726/17 |
| 2015/0135907 A1 | 5/2015 | Hirabayashi et al. |
| 2015/0137721 A1 | 5/2015 | Yamamoto et al. |
| 2015/0158157 A1 | 6/2015 | Hirabayashi et al. |
| 2015/0158170 A1 | 6/2015 | Nitsche et al. |
| 2015/0162646 A1 | 6/2015 | Kawase et al. |
| 2015/0171654 A1 | 6/2015 | Horie et al. |
| 2015/0179036 A1 | 6/2015 | Heine et al. |
| 2015/0191096 A1 | 7/2015 | Becker et al. |
| 2015/0213238 A1 | 7/2015 | Farha |
| 2015/0233757 A1 | 8/2015 | Ebner |
| 2015/0258679 A1* | 9/2015 | Izhikevich ............ A63H 30/04 700/250 |
| 2015/0286209 A1 | 10/2015 | Kreuzer et al. |
| 2015/0340921 A1 | 11/2015 | Suda et al. |
| 2015/0363710 A1 | 12/2015 | Meier et al. |
| 2016/0071340 A1 | 3/2016 | Kauth |
| 2016/0129569 A1* | 5/2016 | Lehnert ............ B25B 23/1425 340/12.54 |
| 2016/0171788 A1 | 6/2016 | Wenger et al. |
| 2016/0212138 A1* | 7/2016 | Lehane ............... G06F 21/6218 |
| 2016/0241653 A1* | 8/2016 | Ciepiel ............... H04L 67/306 |
| 2016/0325391 A1* | 11/2016 | Stampfl ............... H04Q 9/00 |
| 2016/0342151 A1* | 11/2016 | Dey, IV ............... G06F 3/04847 |
| 2017/0008159 A1 | 1/2017 | Boeck et al. |
| 2017/0116431 A1 | 4/2017 | Lee et al. |
| 2022/0203524 A1* | 6/2022 | Passot ............... B25J 9/163 |

FOREIGN PATENT DOCUMENTS

| | | |
|---|---|---|
| DE | 3803357 A1 | 8/1989 |
| DE | 10029132 A1 | 1/2002 |
| DE | 10029138 A1 | 1/2002 |
| DE | 10309703 A2 | 9/2004 |
| DE | 202006014606 U1 | 1/2007 |
| EP | 2147750 A1 | 1/2010 |
| EP | 2995429 A1 | 3/2016 |
| GB | 2451957 A | 2/2009 |
| JP | 2000176850 A | 6/2000 |
| JP | 2004072563 A | 3/2004 |
| JP | 2006123080 A | 5/2006 |
| NO | 2007090258 A1 | 8/2007 |
| WO | 97023986 A1 | 7/1997 |
| WO | 02030624 A2 | 4/2002 |
| WO | 2009013045 A1 | 1/2009 |
| WO | 2013116303 A1 | 8/2013 |

OTHER PUBLICATIONS

O'Connor, "Power Tool Torque Controller," May 2007, pp. 1-11.

* cited by examiner

| PROFILE NAME | PROFILE TYPE | TOOL TYPE | CREATOR NAME | GROUP NAME | CREATED DATE | MODIFIED DATE | SHARE LEVEL | OTHER CHARACTERISTICS | KEYWORDS |
|---|---|---|---|---|---|---|---|---|---|
| DECK SCREW MODE | CUSTOM IMPACT DRIVE CONTROL | IMPACT DRIVER | USER F | GROUP II | 4/15/2015 | 6/1/2015 | PUBLIC | HEX DRIVING BIT, 3 INCH DECK SCREWS, WOOD | JANE DOE'S HOUSE JOBSITE, DECK BOARDS |
| BOB'S SCREW MODE | SELF-TAPPING SCREW (IMPACT) | IMPACT DRIVER | USER X | N/A | 3/30/2015 | N/A | PRIVATE | N/A | DECK |
| 2" #8 ACME SCREW MODE | SELF-TAPPING SCREW (HAMMER) | HAMMER DRILL | ACME CO. | N/A | 5/12/2015 | N/A | PUBLIC | N/A | SHELVING PROJECT |
| CUSTOM DRIVE CONTROL (DEFAULT) | CUSTOM IMPACT DRIVE CONTROL | IMPACT DRIVER | MANUFACTURER | N/A | 1/15/2015 | N/A | PUBLIC | N/A | N/A |
| SELF-TAPPING SCREW (IMPACT) (DEFAULT) | SELF-TAPPING SCREW (IMPACT) | IMPACT DRIVER | MANUFACTURER | N/A | 1/15/2015 | N/A | PUBLIC | N/A | N/A |
| DECK MODE | CUSTOM IMPACT DRIVE CONTROL | IMPACT DRIVER | USER A | N/A | 3/21/2015 | N/A | PUBLIC | N/A | CEDAR DECK |
| DRYWALL SCREWS | CUSTOM IMPACT DRIVE CONTROL | IMPACT DRIVER | USER A | GROUP I | 4/12/2015 | 5/12/2015 | GROUP | PHILLIPS DRIVING BIT, 1 1/4" DRY WALL SCREWS, DRY WALL | DRYWALL, PLAZA JOB |

FIG. 12

| PERMISSION LEVEL | PERMISSIONS |
|---|---|
| ADMINISTRATIVE LEVEL | ADD/REMOVE USER TO GROUP, ASSIGN/UNASSIGN TOOL TO USER IN GROUP, ADD/REMOVE/EDIT INVENTORY FOR GROUP, ENABLE/DISABLE/RESET TOOL LOCKOUT, ADD/EDIT/DELETE PROFILES ON ASSIGNED TOOL, ADD/EDIT/DELETE PROFILES OF THE GROUP, SHARE PROFILES TO THE PUBLIC, SHARE PROFILES TO THE GROUP |
| FOREMAN LEVEL | ASSIGN/UNASSIGN TOOL TO USER IN GROUP, ENABLE/DISABLE/RESET TOOL LOCKOUT, ADD/EDIT/DELETE PROFILES ON ASSIGNED TOOL, ADD/EDIT/DELETE PROFILES OF THE GROUP, SHARE PROFILES TO THE PUBLIC, SHARE PROFILES TO THE GROUP |
| OPERATOR LEVEL | ADD/EDIT/DELETE PROFILES ON ASSIGN TOOL, SHARE PROFILES TO THE PUBLIC, SHARE PROFILES TO THE GROUP |
| LIMITED OPERATOR LEVEL | ADD/EDIT/DELETE PROFILES ON ASSIGNED TOOL |
| NONE | NONE (MODE SELECTION VIA MODE PADE ON TOOL, BUT NO TOOL CONFIGURATION) |
| INDEPENDENT OPERATOR | FULL PERMISSION FOR HIS/HER ASSOICATED TOOLS |

FIG. 17A

POWER TOOL PROFILE SHARING AND PERMISSIONS

RELATED APPLICATIONS

This application is a continuation of U.S. patent application Ser. No. 16/453,618, filed on Jun. 26, 2019, which is a continuation of U.S. patent application Ser. No. 15/183,914, filed on Jun. 16, 2016, now U.S. Pat. No. 10,380,883, which claims priority to U.S. Provisional Application No. 62/180, 592, filed on Jun. 16, 2015, the entire contents of all of which are hereby incorporated by reference.

FIELD OF THE INVENTION

The present invention relates to power tools that communicate with an external device.

SUMMARY

One embodiment provides a method of programming a power tool from an external device. The method includes establishing, with an external wireless communication controller of the external device, a first communication link with a server. The server includes a profile bank that includes mode profiles generated by a plurality of users, and the mode profiles include power tool configuration data. The method further includes receiving, with the external wireless communication controller over the first communication link, a list of mode profiles representing a subset of the mode profiles of the profile bank. The method further includes receiving, in response to user input from a first user on the external device, a selection of a mode profile from the list of mode profiles. The method further includes transmitting, with the external wireless communication controller over the first communication link, the selection of the mode profile. The method further includes receiving, with the external wireless communication controller over the first communication link, the mode profile, the mode profile having been generated by a second user. The method further includes transmitting wirelessly, to the power tool, the mode profile to configure the power tool.

Another embodiment provides a method of providing power tool configuration data to an external device. The method includes establishing, with a network interface of a server, a first communication link with the external device. The server includes a profile bank that includes mode profiles generated by a plurality of users, and the mode profiles include power tool configuration data. The method further includes transmitting, from the network interface over the first communication link, a list of mode profiles representing a subset of the mode profiles of the profile bank. The method further includes receiving, with the network interface over the first communication link, a selection of a mode profile from the subset of the mode profiles. The selection of the mode profile is made by a first user. The method further includes transmitting, from the network interface over the first communication link, the mode profile, the mode profile having been generated by a second user.

Another embodiment provides a server accessible by an external device. The server comprises a processor, a network interface, and a memory. The network interface establishes a first communication link with the external device. The memory includes a profile bank that includes mode profiles generated by a plurality of users. The mode profiles include power tool configuration data. The network interface is configured to transmit, over the first communication link, a list of mode profiles representing a subset of the mode profiles of the profile bank. The network interface is further configured to receive, over the first communication link, a selection of a mode profile from the subset of the mode profiles. The selection of the mode profile is made by a first user. The network interface is further configured to transmit, over the first communication link, the mode profile, wherein the mode profile was generated by a second user.

BRIEF DESCRIPTION OF THE DRAWINGS

FIG. 12 illustrates an exemplary portion of a tool profile bank.

FIG. 17A illustrates an exemplary permissions data table.

DETAILED DESCRIPTION

Figure 1:
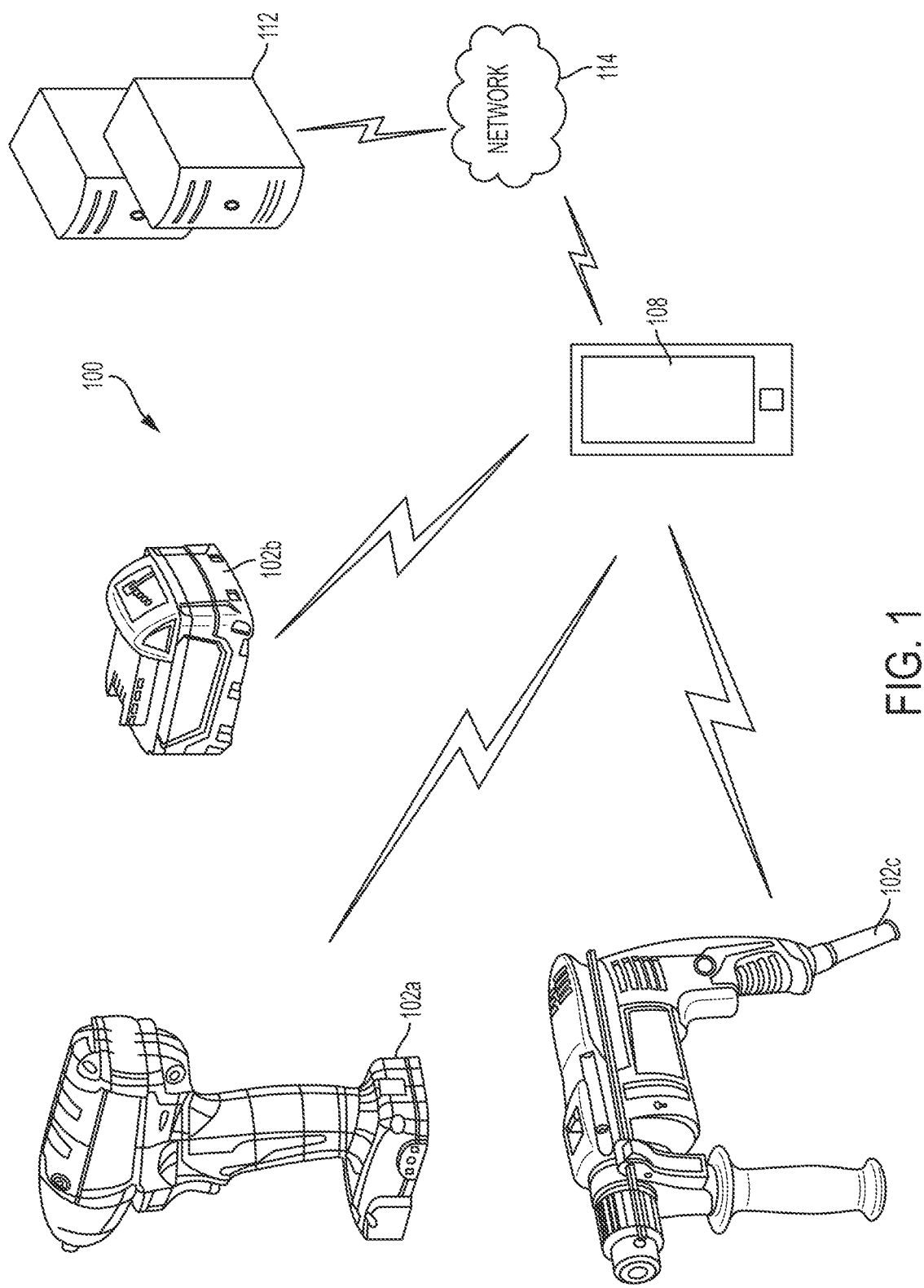
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 102 and an external device 108. Each power tool device 102 (e.g., battery powered impact driver 102a, power tool battery pack 102b, and mains-powered hammer drill 102c) and the external device 108 can communicate wirelessly while they are within a communication range of each other. Each power tool device 102 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit data to the power tool device 102 for power tool configuration, for firmware updates, or to send commands (e.g., turn on a work light). The external device 108 also allows a user to set operational parameters, safety parameters, select tool modes, and the like for the power tool device 102. As indicated above in this paragraph, in some embodiments, the power tool devices 102 may communicate with each other. In some embodiments, the power tool devices 102 communicate with each other to relay information received from the external device 108 to other power tools devices 102, for example, to power tool devices 102 outside of direct communication range with the external device 108.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with the controller of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations (e.g., via a web browser on a laptop computer). In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless interface or with the same wireless interface that the power tool device 102 uses to communicate with the external device 108.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool.

Figure 2:
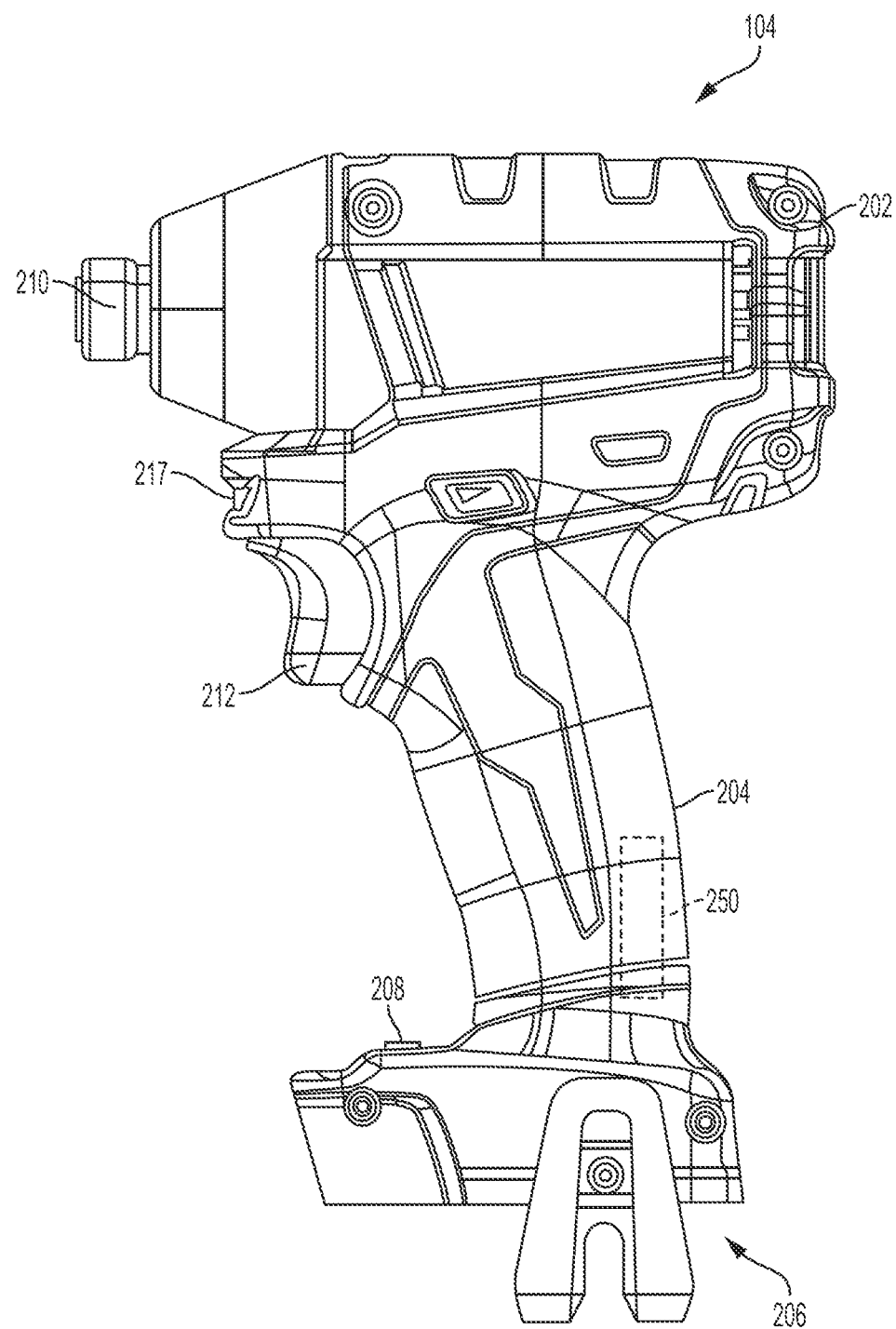
FIG. 2 illustrates a power tool of the communication system.

The particular power tool devices 102 illustrated and described herein (e.g., an impact driver) are merely representative as embodiments include a variety of types of power tools 102 (e.g., a power drill, a hammer drill, a pipe cutter, a sander, a nailer, a grease gun, etc.). FIG. 2 illustrates an example of the power tool devices 102, an impact driver 104 (herein power tool 104). The power tool 104 is representative of various types of power tools that operate within system 100. Accordingly, the description with respect to the power tool 104 in the system 100 is similarly applicable to other types of power tools. As shown in FIG. 2, the power tool 104 includes an upper main body 202, a handle 204, a battery pack receiving portion 206, mode pad 208, an output drive device or mechanism 210, a trigger 212, and a work light 217. The housing of the power tool 104 (e.g., the main body 202 and the handle 204) are composed of a durable and light-weight plastic material. The drive device 210 is composed of a metal (e.g., steel). The drive device 210 on the power tool 104 is a socket for receiving a drill or driver bit. However, each power tool 104 may have a different drive device 210 specifically designed for the task associated with the power tool 104. For example, the drive device for a power drill may include a chuck for receiving and driving a bit, while the drive device for a pipe cutter may include a blade holder for holding and driving a saw blade. The battery pack receiving portion 206 is configured to receive and couple to the battery pack (e.g., 102b of FIG. 1) that provides power to the power tool 104. The battery pack receiving portion 206 includes a connecting structure to engage a mechanism that secures the battery pack and a terminal block to electrically connect the battery pack to the power tool 104. The mode pad 208 allows a user to select a mode of the power tool 104 and indicates to the user the currently selected mode of the power tool 104, which are described in greater detail below.

Figure 3A:
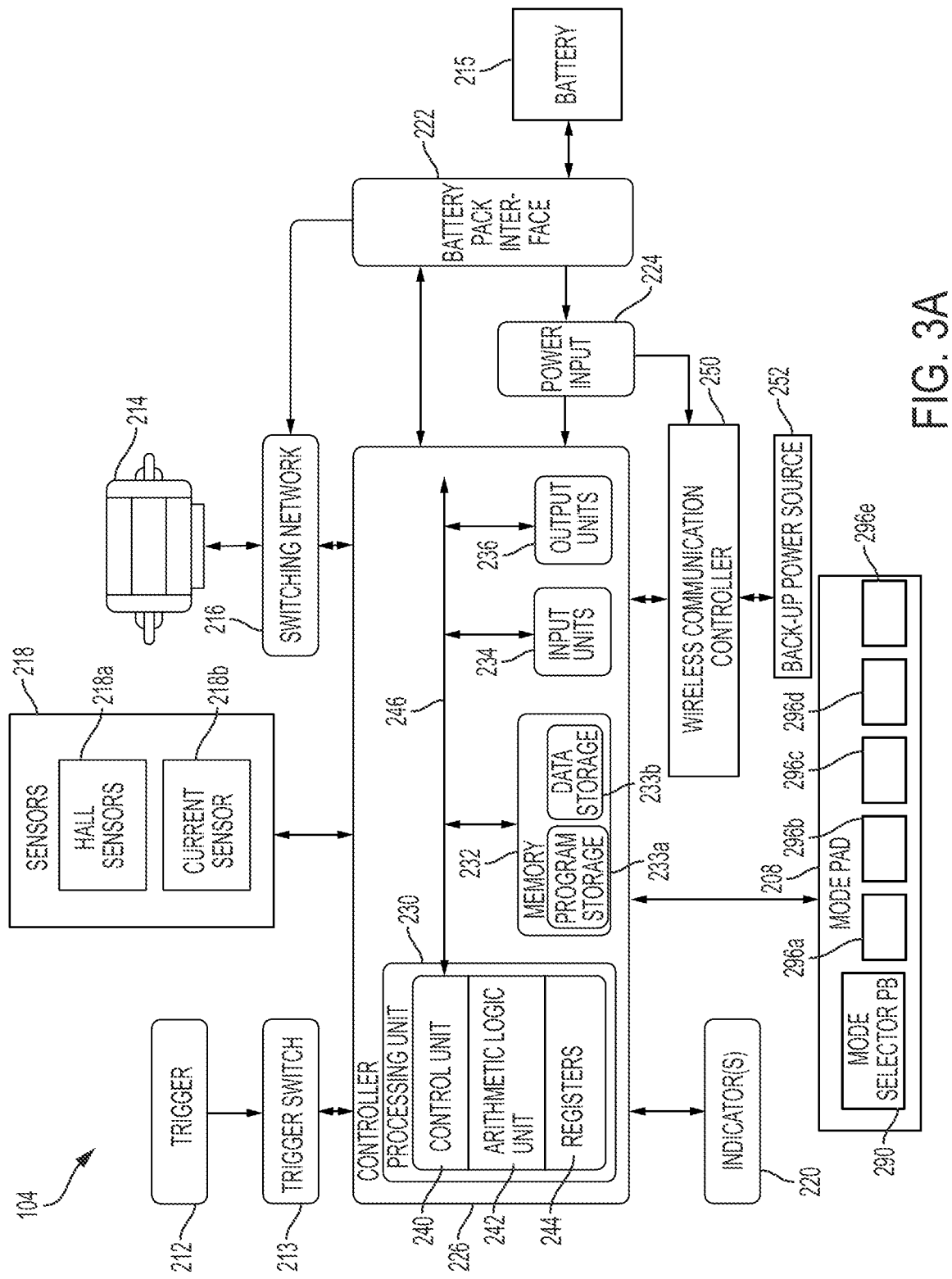
FIGS. 3A-B illustrate a schematic diagram of the power tool.
Figure 3B:
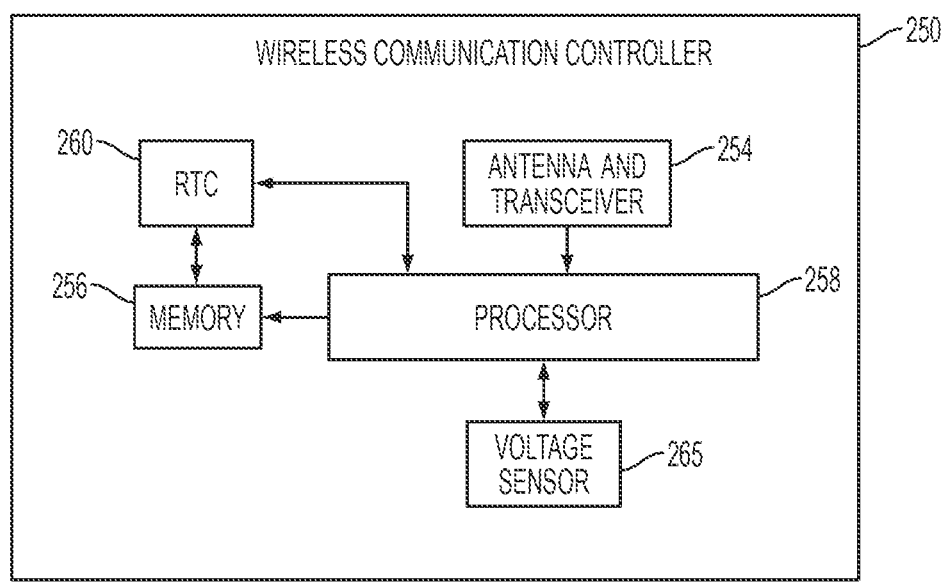

FIGS. 3A-B illustrates a schematic diagram of the tool 104. As shown in FIG. 3A, the power tool 104 also includes a motor 214. The motor 214 actuates the drive device 210 and allows the drive device 210 to perform the particular task. A primary power source (e.g., a battery pack) 215 couples to the power tool 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the handle 204; however, in other embodiments the trigger 212 extends down the entire length of the handle 204 or may be positioned elsewhere on the power tool 104. The trigger 212 is moveably coupled to the handle 204 such that the trigger 212 moves with respect to the tool housing. The trigger 212 is coupled to a push rod, which is engageable with a trigger switch 213 (see FIG. 3A). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch 213 may be analog or digital.

As also shown in FIG. 3A, the power tool 104 includes a switching network 216, sensors 218, indicators 220, a battery pack interface 222, a power input unit 224, a controller 226, a wireless communication controller 250, and a back-up power source 252. The battery pack interface 222 is coupled to the controller 226 and couples to the battery pack 215. The battery pack interface 222 includes a combination of mechanical (e.g., the battery pack receiving portion 206) and electrical components configured to and operable for interfacing (e.g., mechanically, electrically, and communicatively connecting) the power tool 104 with a battery pack 215. The battery pack interface 222 is coupled to the power input unit 224. The battery pack interface 222 transmits the power received from the battery pack 215 to the power input unit 224. The power input unit 224 includes active and/or passive components (e.g., voltage step-down controllers, voltage converters, rectifiers, filters, etc.) to regulate or control the power received through the battery pack interface 222 and to the wireless communication controller 250 and controller 226.

The switching network 216 enables the controller 226 to control the operation of the motor 214. Generally, when the trigger 212 is depressed as indicated by an output of the trigger switch 213, electrical current is supplied from the battery pack interface 222 to the motor 214, via the switching network 216. When the trigger 212 is not depressed, electrical current is not supplied from the battery pack interface 222 to the motor 214.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous field-effect transistors (FETs), bipolar transistors, or other types of electrical switches. For instance, the switching network 216 may include a six-FET bridge that receives pulse-width modulated (PWM) signals from the controller 226 to drive the motor 214.

The sensors 218 are coupled to the controller 226 and communicate to the controller 226 various signals indicative of different parameters of the power tool 104 or the motor 214. The sensors 218 include Hall sensors 218a, current sensors 218b, among other sensors, such as, for example, one or more voltage sensors, one or more temperature sensors, and one or more torque sensors. Each Hall sensor 218a outputs motor feedback information to the controller 226, such as an indication (e.g., a pulse) when a magnet of the motor's rotor rotates across the face of that Hall sensor. Based on the motor feedback information from the Hall sensors 218a, the controller 226 can determine the position, velocity, and acceleration of the rotor. In response to the motor feedback information and the signals from the trigger switch 213, the controller 226 transmits control signals to control the switching network 216 to drive the motor 214. For instance, by selectively enabling and disabling the FETs of the switching network 216, power received via the battery pack interface 222 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214 to be at a desired level.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, the mode of the power tool (discussed below), etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 (herein, processor 230) includes, among other things, a control unit 240, an arithmetic logic unit ("ALU") 242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233a and a data storage area 233b. The program storage area 233a and the data storage area 233b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232 including operational data, information identifying the type of tool, a unique identifier for the particular tool, and other information relevant to operating or maintaining the power tool 104. The tool usage information, such as current levels, motor speed, motor acceleration, motor direction, number of impacts, may be captured or inferred from data output by the sensors 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the foot of the power tool 104 (see FIG. 2) to save space and ensure that the magnetic activity of the motor 214 does not affect the wireless communication between the power tool 104 and the external device 108. As a particular example, in some embodiments, the wireless communication controller 250 is positioned under the mode pad 208. In some embodiments, the wireless communication controller 250 may be included in the controller 226.

As shown in FIG. 3B, the wireless communication controller 250 includes a radio transceiver and antenna 254, a memory 256, a processor 258, a real-time clock (RTC) 260, and a voltage sensor 265. The radio transceiver and antenna 254 operate together to send and receive wireless messages to and from the external device 108 and the processor 258. The memory 256 can store instructions to be implemented by the processor 258 and/or may store data related to communications between the power tool 104 and the external communication device 108 or the like. The processor 258 for the wireless communication controller 250 controls wireless communications between the power tool 104 and the external device 108. For example, the processor 258 associated with the wireless communication controller 250 buffers incoming and/or outgoing data, communicates with the controller 226, and determines the communication protocol and /or settings to use in wireless communications.

In the illustrated embodiment, the wireless communication controller 250 is a Bluetooth® controller. The Bluetooth® controller communicates with the external device 108 employing the Bluetooth ® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, a proprietary protocol, etc.) over different types of wireless networks. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device/network 108 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the battery pack 215 when the battery pack 215 is connected to the power tool 104 and receives power from the back-up power source 252 when the battery pack 215 is not connected to the power tool 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time. The other components of the wireless communication controller 250 also receive power from the battery pack 215, if present, or else from the back-up power source 252. Accordingly, the wireless communication controller 250 is operable to function, at least on a limited basis, when the battery pack 215 is not present or has a low state of charge. For instance, the tool 104 is operable to identify itself to the external device 108 even when the battery pack 215 is not present or is low. In some embodiments, the wireless communication controller 250 includes the voltage sensor 265 (see FIG. 3B) coupled to the back-up power source 252. The wireless communication controller 250 uses the voltage sensor 265 to determine the state of charge of the back-up power source 252.

The power tool 104 periodically, or upon request, broadcasts identifying information to the external device 108. The memory 232 stores various identifying information of the power tool 104 including the unique binary identifier (UBID), an ASCII serial number, an ASCII nickname, and a decimal catalog number. The UBID both uniquely identifies the type of tool and provides a unique serial number for each power tool 104. For instance, the UID is five bytes total, with two bytes dedicated to the type of tool and three bytes dedicated to the serial number of the tool. For instance, the first two byes may identify the type of tool as hammer drill model number 1234, impact driver model number 2345, or circular saw model number 3456. The ASCII serial number is a thirteen ASCII character code that uniquely identifies the tool 104. The ASCII nickname may be limited to a certain number of characters, such as twenty ASCII characters. The UBID, serial number, and catalog number are set and stored in the memory 232 at the manufacturer and are intended to be permanent. At the time of manufacture, a default nickname may also be provided to each power tool 104 (e.g., "impact driver"). However, the ASCII nickname may be over-written by a user via the external device 108. Additional or alternative techniques for uniquely identifying the power tool 104 are used in some embodiments. For instance, in addition to or instead of the above-noted identifiers, the memory 232 stores an Internet Protocol (IP) address, a media access control (MAC) address, and/or subscriber identity module (SIM) address to uniquely identify the power tool 104. Each of these identifiers may be stored on both the power tool 104 and the server 112 and are associated with one another. Thus, the power tool 104 can be named and identified in multiple ways that are globally unique, and cross referenced with other identifiers that are personally unique or meaningful for users. In some embodiments, a radio frequency identification (RFID) tag is incorporated in or on the power tool 104. The RFID tag includes one or more of the noted identifiers of the power tool 104, and the external device 108 is operable to scan and read the identifier(s) from a memory of the RFID tag to identify the associated power tool 104.

Figure 4:
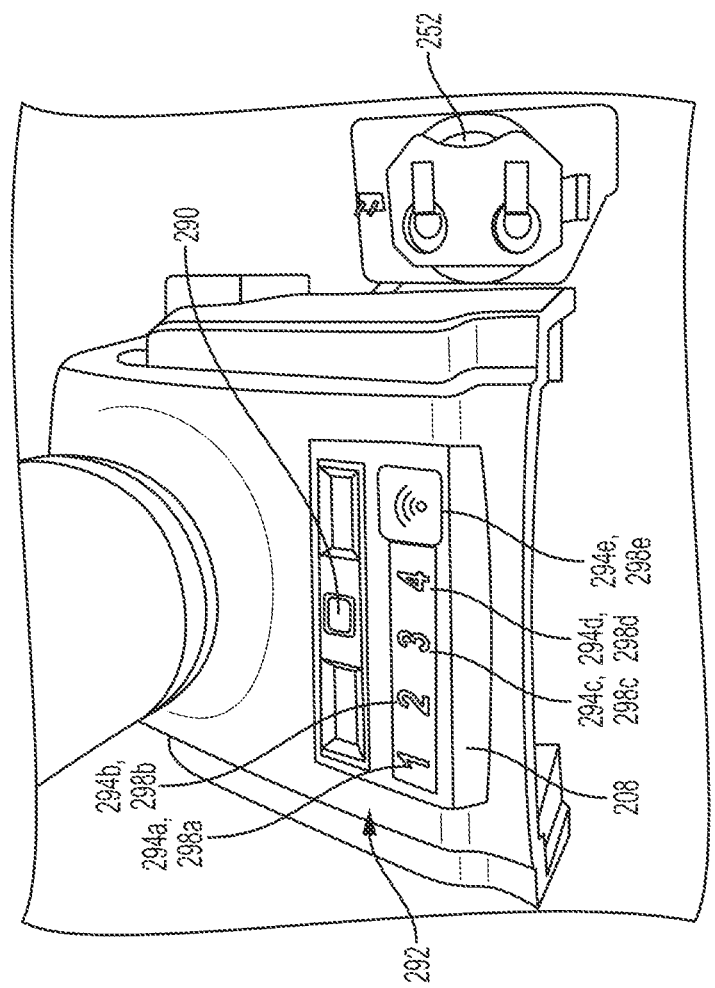
FIG. 4 illustrates a mode pad of the power tool.

FIG. 4 illustrates a more detailed view of the mode pad 208. The mode pad 208 is a user interface on the foot of the tool 104. The mode pad 208 includes the mode selection switch 290 and mode indicator LEDs block 292 having mode indicators 294*a-e*, each mode indicator 294*a-e* including one of LEDs 296*a-e* (see FIG. 3A) and an associated one of indicating symbols 298*a-e* (e.g., "1", "2", "3", "4", and a radio wave symbol). When an LED 296 is enabled, the associated indicating symbol 298 is illuminated. For instance, when LED 296*a* is enabled, the "1" (indicating symbol 298*a*) is illuminated.

The power tool 104 has five selectable modes (one, two, three, four, and adaptive), each associated with a different one of the mode indicators 294*a-e*. The mode selection switch 290 is a pushbutton that cycles through the five selectable modes upon each press (e.g., mode 1, 2, 3, 4, 5, 1, 2, and so on). The adaptive mode is represented by the indicating symbol 298*e* (the radio wave symbol). In the adaptive mode, the user is able to configure the power tool 104 via the external device 108, as is described in further detail below. In other embodiments, the power tool 104 has more or fewer modes, and the mode selection switch 290 may be a different type of switch such as, for example, a slide switch.

Figure 5:
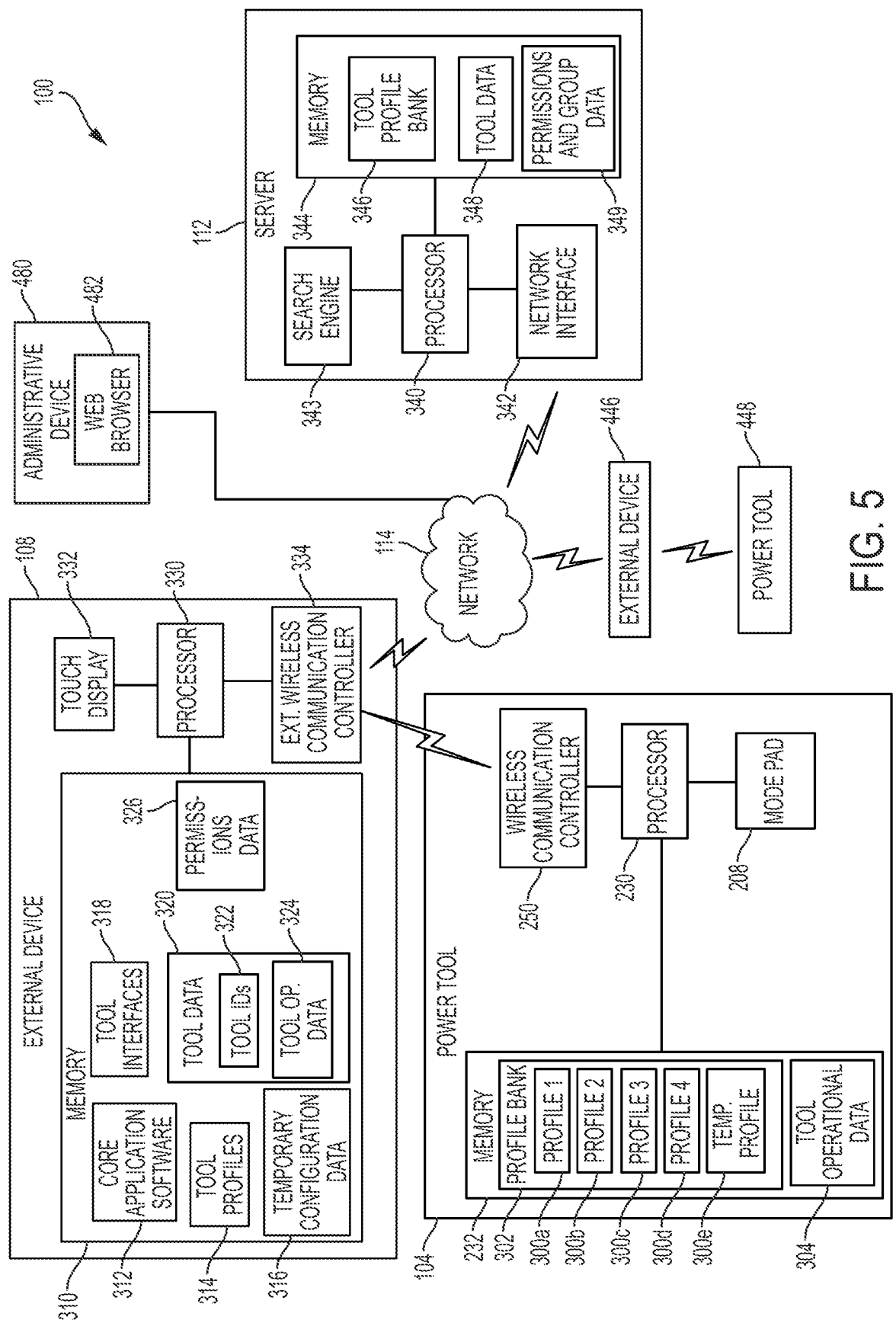
FIG. 5 illustrates a block diagram of the communication system including the power tool.

FIG. 5 illustrates a block diagram of the communication system 100 including the power tool 104. With reference to FIG. 5, modes one, two, three, and four of the power tool 104 are each associated with a mode profile configuration data block (a "mode profile" or "profile") 300*a-d*, respectively, saved in the memory 232 in a (mode) profile bank 302. Each mode profile 300 includes configuration data that defines the operation of the tool 104 when activated by the user (e.g., upon depressing the trigger 212). For instance, a particular mode profile 300 may specify the motor speed, when to stop the motor, the duration and intensity of the work light 217, among other operational characteristics. The adaptive mode is associated with a temporary mode profile 300*e* saved in the memory 232. The memory 232 also stores tool operational data 304, which includes, for example, information regarding the usage of the power tool 104 (e.g., obtained via the sensors 218), information regarding the maintenance of the power tool 104, and power tool trigger event information (e.g., whether and when the trigger is depressed and the amount of depression).

The external device 108 includes a memory 310 storing core application software 312, tool mode profiles 314, temporary configuration data 316, tool interfaces 318, tool data 320 including received tool identifiers 322 and received tool operational data 324, and permissions data 326. The external device 108 further includes a processor 330, a touch screen display 332, and an external wireless communication controller 334. The processor 330 and memory 310 may be part of a controller having similar components as controller 226. The touch screen display 332 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches. The external device 108 communicates wirelessly with the wireless communication controller 250 via the external wireless communication controller 334, e.g., using a Bluetooth® or Wi-Fi® protocol. The external wireless communication controller 334 further communicates with the network 114. In some instances, the external wireless communication controller 334 includes two separate wireless communication controllers, one for communicating with the wireless communication controller 250 (e.g., using Bluetooth® or Wi-Fi® communications) and one for communicating with the network 114 (e.g., using Wi-Fi or cellular communications).

The server 112 includes a processor 340 that communicates with the external device 108 over the network 114 using a network interface 342 and a search engine 343. The communication link between the network interface 342, the network 114, and the external wireless communication controller 334 may include various wired and wireless communication pathways, various network components, and various communication protocols. The server 112 further includes a memory 344 including a tool profile bank 346, tool data 348, and permissions and group data 349. The search engine 343 receives search requests, e.g., from the external device 108, having search parameters. The search engine 343 searches one or more databases on the memory 344 (e.g., the tool profile bank 346) and generates a result list. The results list is transmitted back to the requester via the network interface 342.

Returning to the external device 108, the core application software 312 is executed by the processor 330 to generate a graphical user interface (GUI) on the touch screen display 332 enabling the user to interact with the power tool 104 and server 112. In some embodiments, a user may access a repository of software applications (e.g., an "app store" or "app marketplace") using the external device 108 to locate and download the core application software 312, which may be referred to as an "app." The tool profiles 314, tool interfaces 318, or both may be bundled with the core application software 312 such that, for instance, downloading the "app" includes downloading the core application software 312, tool profiles 314, and tool interfaces 318. In some embodiments, the app is obtained using other techniques, such as downloading from a website using a web browser on the external device 108. As will become apparent from the description below, at least in some embodiments, the app on the external device 108 provides a user with a single entry point for controlling, accessing, and/or interacting with a multitude of tool types. This approach contrasts with, for instance, having a unique app for each tool type or for small groupings of related tool types.

Figure 6:
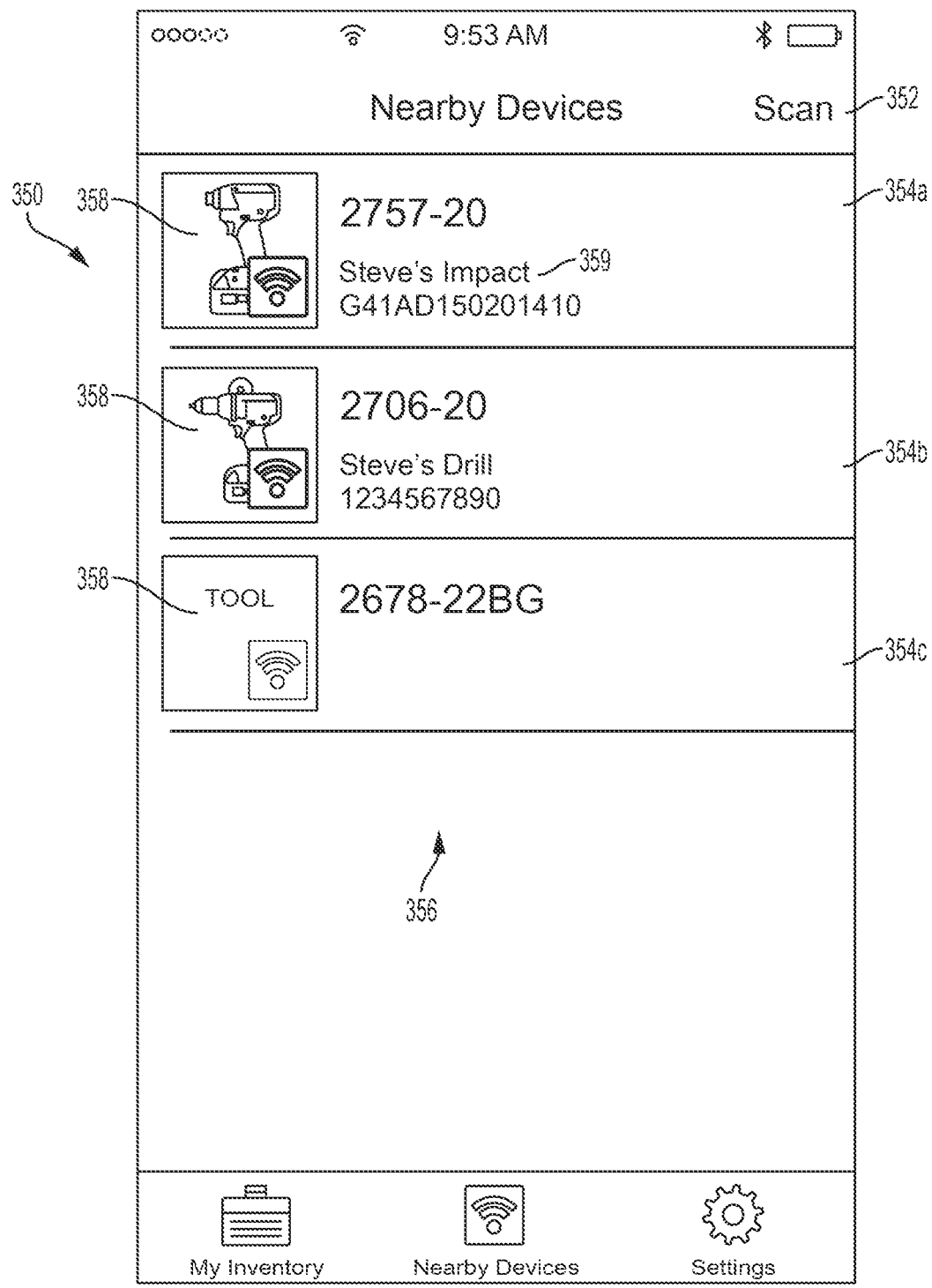
FIGS. 6-11 illustrate exemplary screenshots of a user interface of an external device of the communication system.

FIG. 6 illustrates a nearby devices screen 350 of the graphical user interface on the touch screen display 332, which is used to identify and communicatively pair with power tools 104 within wireless range of the external device 108. For instance, in response to a user selecting the "scan" input 352, the external wireless communication controller 334 scans a radio wave communication spectrum used by the power tools 104 and identifies any power tools 104 within range that are advertising (e.g., broadcasting their UBID and other limited information). The identified power tools 104 that are advertising are then listed on the nearby devices screen 350. As shown in FIG. 6, in response to a scan, three power tools 104 that are advertising (advertising tools 354a-c) are listed in the identified tool list 356. In some embodiments, if a power tool 104 is already communicatively paired with a different external device, the power tool 104 is not advertising and, as such, is not listed in the identified tool list 356 even though the power tool 104 may be nearby (within wireless communication range of) the external device 108.

The UBID received from the advertising tools 354 is used by the external device 108 to identify the tool type of each advertising tool 354. For instance, the external device 108 converts the first two bytes of the UBID to decimal and displays on the identified tool list 356 the tool type by listing the catalog number (e.g., "2757-20" and "7206-20"). In some instances, a table of tool types is included in the external device 108 indexable by the UBID (e.g., the first two bytes), allowing the external device 108 to display the tool type in another form or language (e.g., "impact driver" or "circular saw").

Additionally, UBIDs received from advertising tools 354 in response to a scan are used to obtain further information about the tool, if available. For instance, the tool data 348 of the server 112 may be a database storing tool information according to UBIDs and the permissions and group data 349 may also be a database storing tool permission levels indexable using the UBID. Accordingly, the UBID may be sent to the server 112, used as an index in the tool data 348 and in the permissions and group data 349, and the server 112 may respond to the external device 108 with tool information and permission levels from these databases. For instance, the database may store and respond to the external device 108 with the ASCII nickname, other tool identifiers, an icon, and permission levels. The external device 108, in turn, displays the ASCII nickname, ASCII serial number, and icon. As shown in the nearby devices screen 350, the advertising tool 354a and 354b include the ASCII nickname, serial number 359, and icon. In some instances, the advertising tools 354 provide the further tool identifiers to the external device 108, rather than the external device 108 obtaining the information from the server 112. In some instances, the external device 108 includes a cache of tool information stored in tool data 320 for power tools 104 previously paired with the external device 108, and which is indexable by the UBID. The cached tool information may include the icon and other identifiers. In some instances, the advertising tool 354c does not include an ASCII nickname and serial number in the identified tool list 356 because the advertising tool 354c is in an advertising state and (a) the additional identifiers are not transmitted to the external device 108 while in the advertising state and (b) the external device 108 has not yet obtained the additional identifiers from the server 112 or the additional identifiers are not available on the server 112.

From the nearby devices screen 350, a user can select one of the advertising tools 354 from the identified tool list 356 to communicatively pair with the selected advertising tool 354. Each type of power tool 104 with which the external device 108 can communicate includes an associated tool graphical user interface (tool interface) stored in the tool interfaces 318. Once a communicative pairing occurs, the core application software 312 accesses the tool interfaces 318 (e.g., using the UBID) to obtain the applicable tool interface for the type of tool that is paired. The touch screen 332 then shows the applicable tool interface. A tool interface includes a series of screens enabling a user to obtain tool operational data, configure the tool, or both. While some screens and options of a tool interface are common to multiple tool interfaces of different tool types, generally, each tool interface includes screens and options particular to the associated type of tool. The power tool 104 has limited space for user input buttons, triggers, switches, and dials. However, the external device 108 and touch screen 332 provide a user the ability to map additional functionality and configurations to the power tool 104 to change the operation of the tool 104. Thus, in effect, the external device 108 provides an extended user interface for the power tool 104, providing further customization and configuration of the power tool 104 than otherwise possible or desirable through physical user interface components on the tool. Examples further explaining aspects and benefits of the extended user interface are found below.

Figure 7:
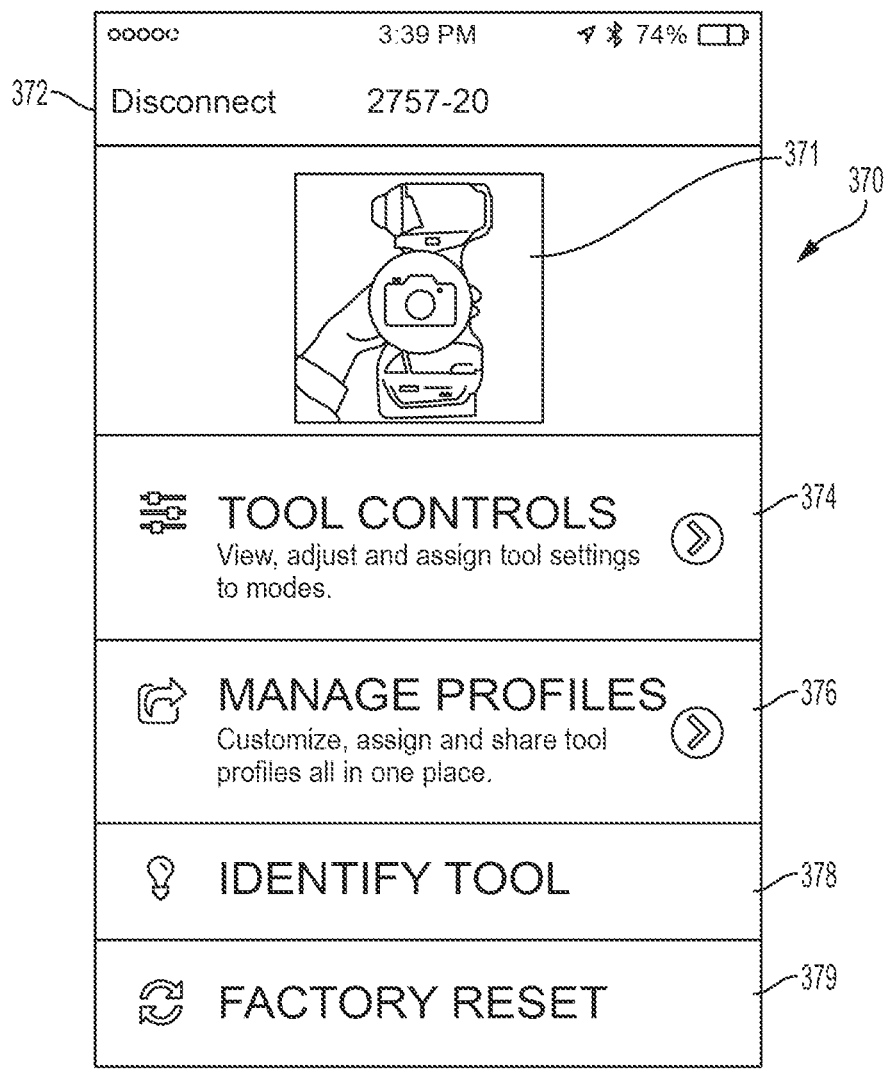

FIG. 7 illustrates a home screen 370 of the tool interface when the power tool 104 is an impact driver. The home screen 370 includes an icon 371 for the particular paired powered tool 104, which may be the same as the icon shown in the list 356. The home screen 370 also includes a disconnect input 372 enabling the user to break the communicative pairing between the external device 108 and the paired power tool 104. The home screen 370 further includes four selectable options: tool controls 374, manage profiles 376, identify tool 378, and factory reset 379. Selecting identify tool 378 sends a command to the paired power tool 104 requesting that the paired power tool 104 provide a user-perceptible indication, such as flashing a work light 217, a light of the indicator 220, flashing LEDs 296, making an audible beep using a speaker of the indicators 220, and/or using the motor 214 to vibrate the tool.

Figure 8B:
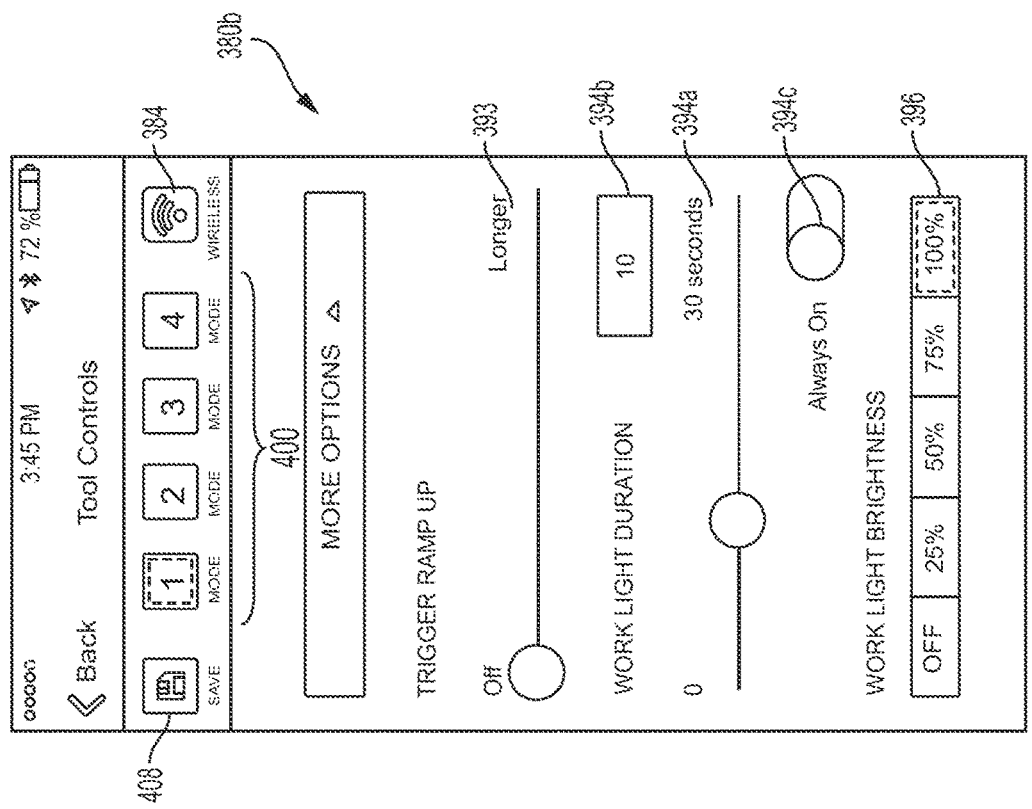
Figure 8A:
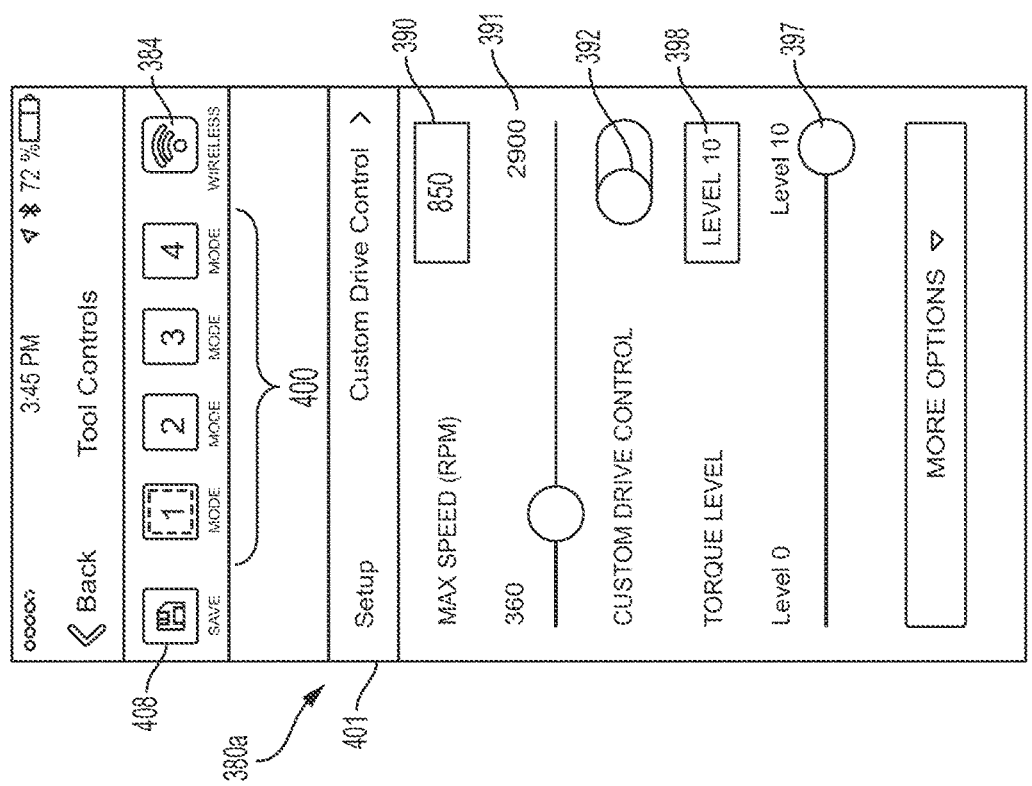

Selecting tool controls 374 causes a control screen of the tool interface to be shown, such as the control screen 380 of FIGS. 8A-B, which includes a top portion 380a and a bottom portion 380b. Generally, the control screen shown depends on the particular type of profile. In other words, generally, each type of profile has a specific control screen. Each control screen has certain customizable parameters that, taken together, form a profile. The particular control screen shown on the external device 108 upon selecting the tool controls 374 is the currently selected profile of the power tool 104 (e.g., one of the profiles 300a-e). To this end, upon selection of the tool controls 374, the external device 108 requests and receives the currently selected one of the profiles 300a-e from the power tool 104. The external device 108 recognizes the profile type of the selected one of the profiles 300*a-e*, generates the appropriate control screen for the profile type, and populates the various parameter settings according to settings from the received profile 300.

When in the adaptive mode, the currently selected profile that is shown on the control screen is the temporary profile 300*e*. Additionally, when the power tool 104 is in the adaptive mode, the power tool 104 is operated according to the temporary profile 300*e*. Upon entering the adaptive mode, a default profile or one of the profiles 300*a-d* may be saved as the temporary profile 300*e*. Further, assuming that the power tool 104 is in the adaptive mode, after the external device 108 initially loads the control screen (e.g., control screen 380) upon selecting the tool controls 374, the user may select a new source of profile data for the temporary file. For instance, upon selecting one of the mode profile buttons 400 (e.g., mode 1, mode 2, mode 3, or mode 4) the associated profile 300*a-d* is saved as the temporary profile 300*e* and sent to the external device 108 and populates the control screen (according to the profile type and profile parameters).

Additionally, assuming the power tool 104 is in the adaptive mode, a user may select a profile type using the setup selector 401. Upon selecting the setup selector 401, a list of available profiles (profile list) 402 for the particular type of paired power tool 104 is shown (see, e.g., FIG. 9). The profile list 402 includes profiles 404 obtained from tool profiles 314 and/or from the tool profile bank 346 over the network 114. These listed profiles 404 include default profiles (e.g., custom drive control profile 404*a* and self-tapping screw profile 404*b*) and custom profiles previously generated and saved by a user (e.g., drywall screws profile 404*c* and deck mode 404*d*), as are described in more detail below. Upon selecting one of the tool profiles 404, the selected profile 404 and its default parameters are illustrated on the control screen of the external device 108 and the profile 404 as currently configured is sent to the power tool 104 and saved as the temporary profile 300*e*. Accordingly, upon a further trigger pull, the power tool 104 will operate according to the selected one of the tool profiles 404.

Figure 10:
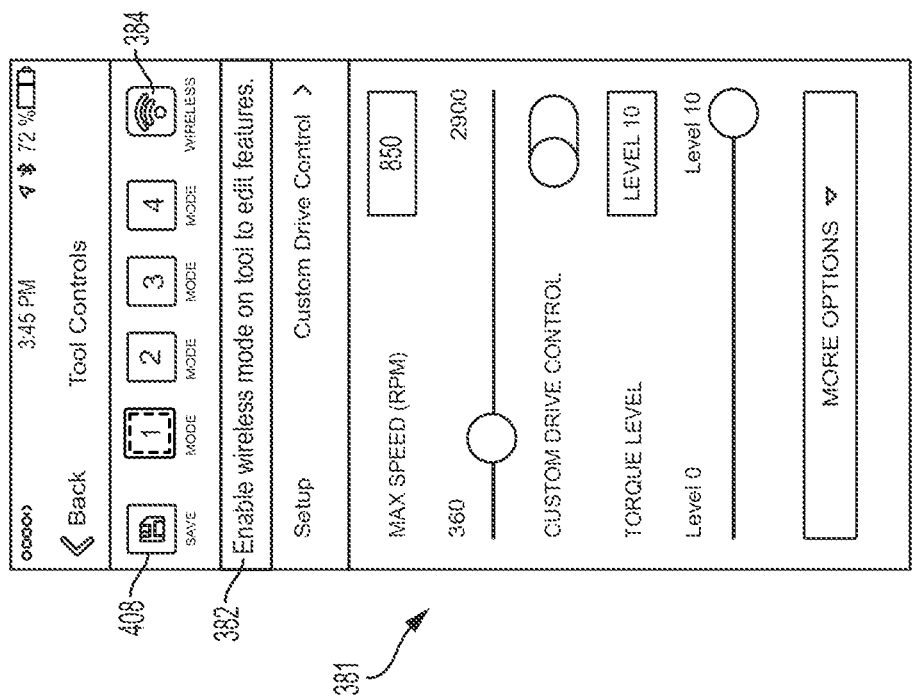

If the adaptive mode is currently selected on the power tool 104, as indicated by the indicating symbol 298*e* (FIG. 4), the user is able to configure the power tool 104 using the control screen 380. If the power tool 104 is in one of the other four tool modes, as indicated by one of the indicating symbols 298*a-d*, the power tool 104 is not currently configurable via the control screen 380. For instance, in FIG. 10, a control screen 381 is illustrated when the power tool is not currently in the adaptive mode. Here, the control screen 381 is similar to the control screen 380, but includes a message 382 indicating that the tool is not in the adaptive mode and a wireless symbol 384 may be shown greyed-out as a further indication that the power tool is not in the adaptive mode. Accordingly, when the power tool 104 is not in the adaptive mode and a user selects one of the mode profile buttons 400, the power tool 104 provides the profile 300 of the associated mode selected by the user, but does not overwrite the temporary profile 300*e* with the profile. Thus, the profiles 300 of the power tool 104 are not updated when the power tool 104 is not in the adaptive mode.

When the power tool 104 is in the adaptive mode and the user selects the tool controls 374 on the home screen, the user is able to configure profile data of the power tool 104 using a control screen of the tool interface. For instance, via the control screen 380, the user is able to configure the current profile data of the temporary profile 300*e* of the power tool 104. As illustrated, the user is able to adjust the maximum speed via the speed text box 390 or the speed slider 391; enable/disable the custom drive control using the toggle 392; alter the trigger ramp up parameter via slider 393; adjust the work light duration with slider 394*a*, work light text box 394*b*, and "always on" toggle 394*c*; and adjust the work light intensity via the work light brightness options 396. Upon enabling the toggle 392, the torque level control elements become active and are no longer greyed-out, such that a user can adjust the torque level using the slider 397 or torque text box 398.

In some embodiments, the external device 108 and power tool 104 enable live updating of the temporary profile 300*e*. When live updating, the temporary profile 300*e* of the power tool 104 is updated as changes to the parameters are made on the control screen 380 without requiring a subsequent saving step or actuation being taken by the user on the graphical user interface of the external device 108 or on the power tool. For instance, with respect to FIG. 8A, the speed of the power tool 104 is set to 850 revolutions per minute (RPM). When live updating, if a user slides the speed slider 391 to the right by dragging his/her finger across the speed slider 391 and then removing his/her finger from the touch screen 332 of the external device 108 upon reaching a maximum speed of 1500 RPM, the external device 108 will send the newly selected maximum speed (1500 RPM) to the power tool 104 to update the temporary profile 300*e* when the user's finger is removed from the screen, without requiring a further depression of a button or other actuation by the user. Live updating is applicable to the other parameters on the control screen 380 as well, such as the custom drive control toggle, the torque level, trigger ramp, and work light parameters. Live updating enables rapid customization of the power tool 104 so that a user may test and adjust various profile parameters quickly with fewer key presses. In contrast to live updating, in some embodiments, after sliding the speed slider 391 to 1500 RPM, the user must press a save button (e.g., save button 408) to effect the update of the maximum speed parameter on the temporary profile 300*e*.

Figure 11:
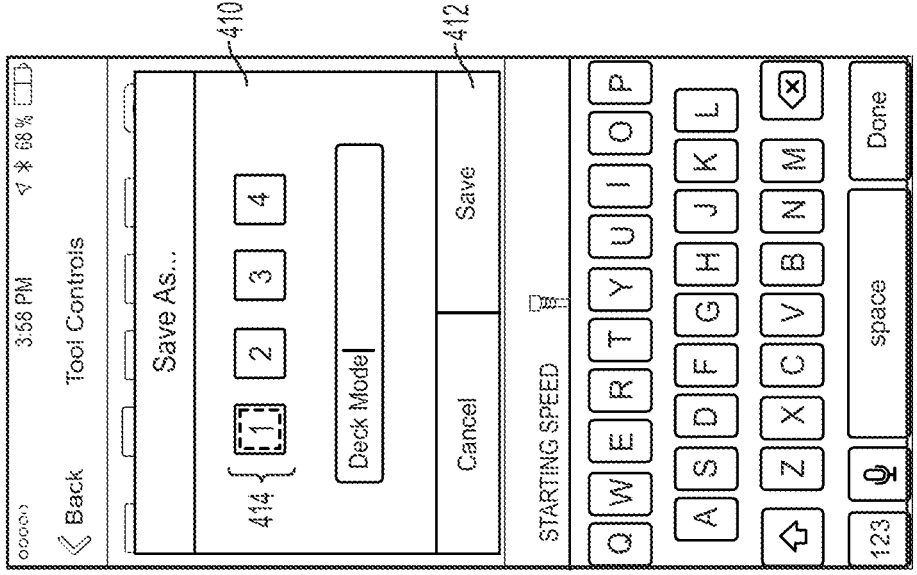

A user is also able to save a profile set via a control screen (e.g., the control screen 380) to the power tool 104. More particularly, the user is able to overwrite one of the profiles 300*a-d* in the profile bank 302 with the profile as specified on a control screen. To save the profile generated by the user via the control screen 380, the user selects the save button 408. As shown in FIG. 11, pressing the save button causes the core application software 312 to generate a save prompt 410 requesting the user to name the created profile and specify which of the profiles 300*a-d* to overwrite with the created profile. In response to the user input, the external device 108 sends the generated profile to the power tool 104. The processor 230 receives the generated profile and overwrites the profiles 300 in the profile bank 302 specified for overwriting by the user with the generated profile. For example, in FIG. 10, the user has named the generated profile "Deck Mode" and specified that the processor 230 overwrite profile 300*a* (associated with mode "1") with the generated "Deck Mode" profile. In some embodiments, the user can elect to overwrite more than one profile 300*a-e* with the generated profile by selecting multiple of the mode labels 414 before selecting the save button 412. In some embodiments, the user can elect to not overwrite any of the profiles 300*a-e* with the generated profile by not selecting any of the mode labels 414 before selecting the save button 412. In such embodiments, the generated profile is saved in the tool profile bank 346 on the server 112, but not on the power tool 104.

In addition to sending the generated profile to the power tool 104 in response to saving the generated profile via save button 412, the external device 108 sends the generated profile to the server 112 via the network 114 for saving in the tool profile bank 346. In some instances, the generated profile is also stored locally on the external device 108 within the tool profiles 314 upon selecting the save button 412. In the power tool 104, server 112, and external device 108, the profile name entered by the user on save prompt 410 is saved with the generated profile. In some embodiments, rather than the actual profile name, a unique hash of the profile name is saved with the generated profile.

The profiles in the tool profile bank 346 of the server 112 may be saved according to a user identifier and a group of which the user is a member. For instance, a user may enter a user name/identifier (User A or bob_smith), a group name/identifier (Group I or Acme Company), and password via the touch screen 332 when initially accessing the graphical user interface of the core application software 312 (e.g., just after launching the app). The external device 108 may provide the user identifier and group identifier to the server 112 along with sending the generated profile for saving in the tool profile bank 346. Accordingly, the profiles generated and saved by a user are associated with the user and the user's group in the tool profile bank 346. In some instances, the user need not provide the group name at login (or for other requests) because the server 112 maintains user-group associations and, therefore, the username is sufficient for the server 112 to determine a group affiliation of the user.

FIG. 12 illustrates an exemplary portion 415 of the tool profile bank 346. As shown in FIG. 12, additional data can be saved with each profile. For instance, each profile may be associated with one or more of a profile name (or a hash thereof), a profile type, tool type, creator's username, group name of the user, creation date, modification date (if saving an update of a previously created profile), a share level (e.g., public, private, group, as discussed below), other characteristics (e.g., one or more of output unit type, such as drill bit or driver bit; fastener type/size, drill bit type/size, workpiece material/size), and keywords (e.g., deck, basement, concrete, hardwood, sheet metal, cabinets, softwood, brick). The user may be prompted to enter a portion of this data when saving the profile (e.g., share level, other characteristics, and keywords), if the data is not already known, whereas some data is known to the system and auto-populated, such as username and group name.

Figure 9:
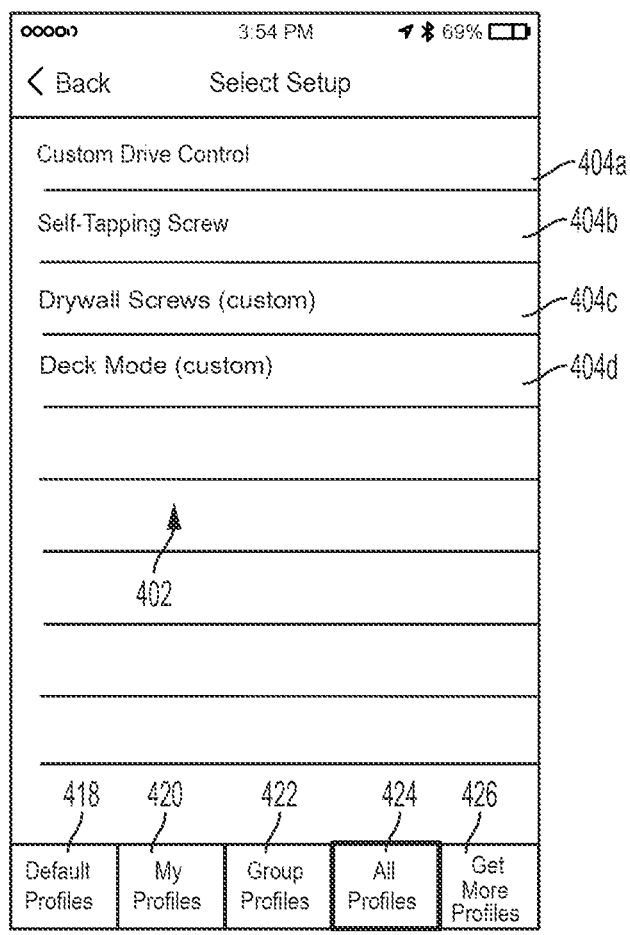

Returning to FIG. 8A, when a user selects the setup selector 401, the external device 108 provides a profile request including, for instance, the user name (e.g., bob_smith), group identifier (e.g., acme company), and the tool type (e.g., impact driver) to the server 112. The server 112, in response, obtains the profiles in the tool profile bank 346 that meet the profile request, such as those profiles that are associated with the provided user name, group, and tool type. The server 112 then provides these profiles back to the external device 108 for display on the profile list 402 (FIG. 9). Generally, only those profiles that are compatible with a particular paired power tool 104 are shown on the profile list 402.

Additionally, a user can select or filter the profiles to be displayed in the profile list 402 using a default profiles tab 418, a my profiles tab 420, a group profiles tab 422, and an all profiles tab 424. Upon selection of the default profiles tab 418, the profiles list 402 lists the default profiles associated with the particular type of tool to which the external device 108 is paired (e.g., profiles from the power tool manufacturer that are associated with the tool type). In the example of FIG. 9, the custom drive control profile 404a and self-tapping screw profile 404b are listed when the default profiles tab 418 is selected. Upon selection of the my profiles tab 420, the profiles list 402 lists the profiles added by the user, which includes those created by the user and those added by the user via the get more profiles tab 426. In the example of FIG. 9, the deck mode 404d is listed when the my profiles tab 420 is selected.

Upon selection of the group profiles tab 422, the profiles list 402 lists the profiles added by an administrator of the group, added by other users of the group, or both, depending on the embodiment. In the example of FIG. 9, the drywall screws profile 404c is listed when the group profiles tab 422 is selected. Upon selection of the all profiles tab 424, the profiles list 402 combines and lists the default profiles, my profiles, and group profiles. The profiles list 402 illustrated in FIG. 9 is an example list generated in response to selection of the all profiles tab 424 and including a listing of the default profiles, my profiles, and group profiles.

The server 112 may include one or more databases associating users and groups with the profiles in the tool profile bank 346. For instance, for each user, the server 112 may track the profiles of the tool profile bank 346 that are part of the user's "my profiles," and for each group, the server 112 may track the profiles that are part of the group's "group profiles." Thus, in response to a user selecting the my profiles tab 420, the external device 108 sends a request with the user's identity to the server 112 for the profiles of the tool profile bank 346 that are associated with the user's "my profiles." The server 112 then responds with the listing of profiles, which are displayed as a profiles list on the external device 108. The server 112 includes another database having default profiles associated with particular tools to provide the list of default profiles to the external device 108 in response to the user selecting the default profiles tab 418.

Figure 13:
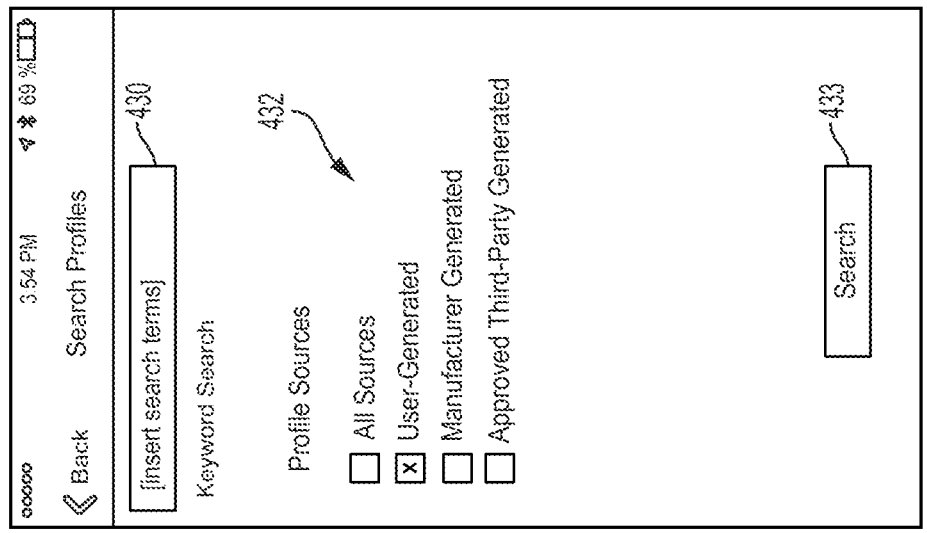

The graphical user interface of FIG. 9 also includes a get more profiles tab 426. Selecting the get more profiles tab 426 causes the core application software 312 to generate a profile search screen 428 for the graphical user interface of the external device 108, as shown in FIG. 13. The profile search screen 428 allows a user to search the tool profile bank 346 for new profiles (for example, as detailed below, users can request and receive profiles created by other users from the server 112). The profile search screen 428 includes a keyword text search box 430 into which the user may enter keywords used to search the profiles in the tool profile bank 346. The profile search screen 428 also includes filters 432 enabling a user to specify the source of the profile as: user-generated profiles, tool manufacturer-generated profiles, third-party-generated profiles, and (by default) any source. User-generated profiles include profiles created by tool operators, project managers, and other end-users, rather than, for example, third party companies (e.g., fastener manufacturers) or the tool manufacturer.

Figure 14:
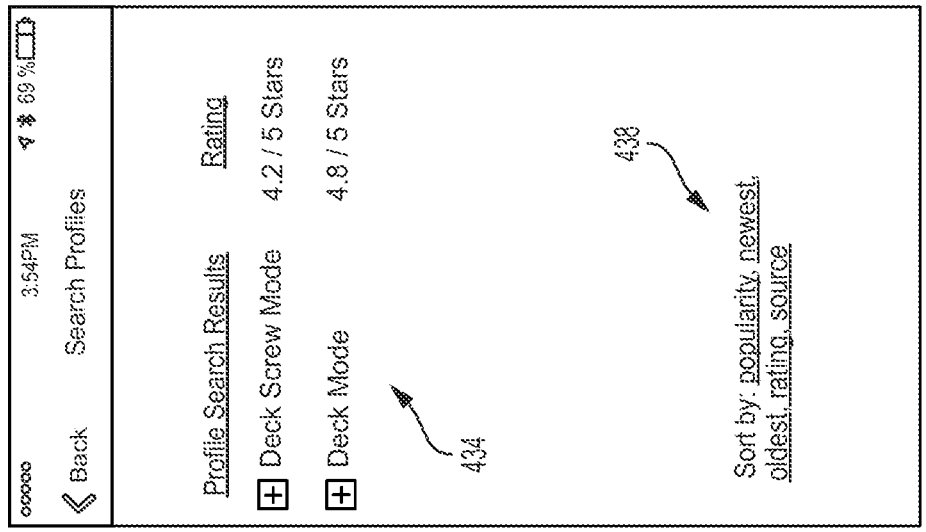
FIGS. 13-14 illustrate further exemplary screenshots of a user interface of the external device of the communication system.

For instance, the user can input "deck" as a keyword and check the "user-generated" box of the filters 432, and then select a search button 433. The external device 108 would provide the keywords and filter selections to the server 112, which includes the search engine 343 for searching the tool profile bank 346. The search engine 343 will return to the external device 108 names of profiles in the tool profile bank 346 that were user-generated and that match or nearly match the keywords. For instance, FIG. 14 illustrates a profiles search results list 434 on the search results screen 436 of graphical user interface of the external device 108 based on a search for "deck" compared against the portion of the tool profile bank 346 shown in FIG. 12. The search results list 434 includes "Deck Screw Mode" and "Deck Mode," as they each have a share level of "public," but does not show the "Bob's Screw Mode" even though this profile has a keyword of "deck" because this profile has a share level of "private."

The share level of each profile defines whether a particular profile will be able to be found through searching and added to another user's profiles. The share level may be, for example, public, private, or group. Profiles with a public share level are generally discoverable by all users. Profiles with a private share level are generally not discoverable through searching and are only retrievable by the creator of that profile. Profiles with a group share level are discoverable by the creator of the profile as well as by other users/members of the group to which the creator belongs. For instance, if user A and user B are in a group I, and user A creates a profile ("profile 123") with a share level of "group," user B will be able to search and find profile 123, add profile 123 to the my profiles list of user B, and assign the profile 123 to a paired power tool 104. However, a user C who is not a member of group I will not be able to find profile 123 through searching and, thus, will not be able to add profile 123 to the my profiles list of user C or assign the profile 123 to a paired tool 104. In some embodiments, other share levels are assigned to profiles to provide different levels of access and modification rights to a profile.

As shown in FIG. 14, each profile of the profiles search results list 434 includes a rating indicator. The rating indicates a summary of user feedback, which may be quantified (e.g., 4.5 on a scale of 1-5) and may be expressed numerically or graphically (e.g., an illustration of 4.5 stars out of 5). In some embodiments, in addition or in place of the rating indicator, the search results list 434 includes a popularity indicator for each profile. The popularity indicator shows the number of downloads (e.g., 400 downloads) of the profile or categorizes the number of downloads based on the number of downloads being within a particular range (e.g., low popularity, medium popularity, high popularity). The server 112 may keep track of and store in the tool profile bank 346 the data for the rating and popularity indicator for each profile. In some embodiments, more, less, or different profile information is displayed for each profile on the profiles search results list 434, such as other information stored in the tool profile bank 346 (e.g., creation date, modification date, creator, group identifier, and/or user identifier). Furthermore, the user is operable to sort the profiles in the search results list 434 according to popularity indicator, rating, creation date, modification data, source (e.g., user-generated or tool manufacturer generated), and other characteristics using the sort options 438.

While FIG. 13 illustrates a single text box 430 for keyword entry, in some instances, additional text boxes for searching various profile data are included. For example, the screen may include separate keyword entry text boxes for each of the profile name, the associated user, and the creator. Additionally, other filters are included on the profile search screen 428, such as date range filters (for creation and/or modification date), rating filters (e.g., at least 3 out of 5 stars), and popularity filters (e.g., at least 100 downloads). Furthermore, such filters may be provided on the search results screen 436.

Returning to FIG. 14, a user selects one of the profiles in the results list 434, and external device 108 provides the selection to the server 112. The server 112, in response, associates the selected profile with the user and transmits the profile (the "shared profile") to the external device 108. The external device 108 returns to the graphical user interface screen of FIG. 9, where the list 402 includes the shared profile as one of "my profiles." Thereafter, a user is operable to select the shared profile from the profile list 402, which saves the shared profile to the power tool 104 in the temporary profile 300e. Thereafter, as described above, the user can assign the shared profile as one of the selectable modes of the power tool 104, in which case the power tool 104 saves the shared profile as one or more of the profiles 300a-d in the memory 232 of the power tool 104. The user is also operable to alter settings of the shared profile on the control screen of the external device 108 and save and assign the modified shared profile as a new user-created profile. In some embodiments, in response to a user selecting one of the profiles in the results list 434, the user is presented with an option to add the profile to "my profiles," to add the profile to the profiles associated with the group of the user, or both.

Returning to FIG. 7, in response to receiving a user selection of manage profiles 376 on the home screen 370, the external device 108 brings a user to a profile management screen, which is similar to the screen shown in FIG. 9. The management screen includes the profiles list 402 and the user can alter and filter the list using the tabs 418, 420, 422, and 424. Additionally, a user can search for and add new profiles using the get more profiles tab 426, as described above. However, selecting a profile on the management screen causes the core application software 312 to generate a profile information screen, rather than proceed to a control screen for the profile, such as the control screen 380 (see FIGS. 8A-B). To generate the profile information screen, the external device 108 sends a profile identifier to the tool profile bank 346, which returns information about the profile. The returned information is displayed on the profile information screen, including one or more of the profile name, profile type, tool type, creation date, revision date, creator, associated user, and associated group, as well as parameter values of the various configurable parameters of the profile.

Additionally, via the profile information screen, the external device 108 provides additional management options: rename, edit, delete, and share. By selecting rename, a user can modify the profile name of the profile. By selecting edit, the user can modify the parameter values of the profile. Renaming and editing involves the external device 108 receiving modification input from the user, the external device 108 providing the modification input to the server 112, and updating the profile in the tool profile bank 346 by the server 112. However, such updates are not sent to the tool. Rather, a user would navigate via the tool controls 374 on the home screen 370 to update a profile stored on the tool 104. By selecting delete, the profile is deleted from the list of profiles forming "my profiles." The profile, however, may remain in the tool profile bank 346 on the server 112. Upon selecting share, a user is able to specify one or more other users or groups to which the profile is to be offered. The server 112, in turn, generates a share profile offer to the recipient(s) including profile information (e.g., the information illustrated in FIG. 12). A recipient user or group may be prompted to add the profile to their "my profiles" list the next time the recipient user launches or logs in to their core application software 312 on their external device. If the recipient accepts, the server 112 sends the profile to the recipient(s) and/or adds the profile to the recipients' "my profiles" or "group profiles."

Furthermore, upon selecting share, a user may alter the share level (privacy setting) of the profile. For instance, when a profile is created and saved in the tool profile bank 346, by default, the saved profile may have a share level set to private. As noted above, the search engine may ignore profiles set to private when generating a list of search results. Thus, another user that searches for profiles to add (e.g., via the profile search screen 428) would not be able to locate or add profiles that a user has set to private. However, via the share option on the profile information screen, the user is able to change the share level to be public, private, group, or another share level. In turn, the search engine will be able to generate a results list that includes shareable profiles. In some embodiments, the default share level setting is set to public or group.

Figure 15A:
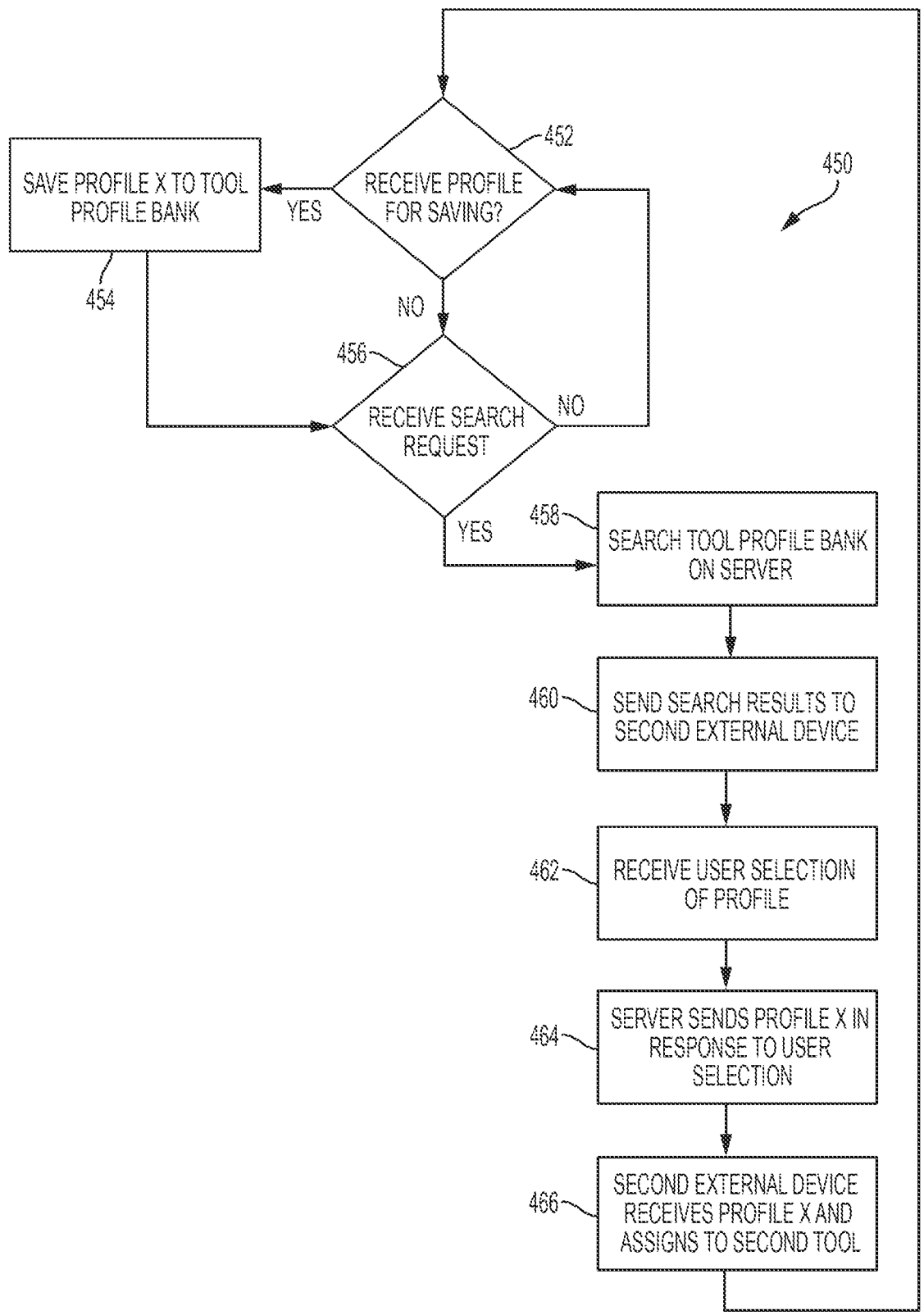
FIGS. 15A and 15B illustrate flowcharts for sharing mode profiles in accordance with an embodiment of the invention.

Thus, the communication system 100 enables the creation and sharing of tool profiles among different users, who can assign the received, shared profiles to their respective tools. For instance, the communication system 100 enables the sharing of profiles with a second external device 446 and a second power tool 448 (see FIG. 5), which are similar to and have similar components as the external device 108 and power tool 104, respectively. FIG. 15A illustrates a method 450 of sharing a tool profile carried out by, for instance, the server 112 of the communication system 100. At block 452, the server 112 determines whether a profile has been received with a request for saving the profile. For instance, such a profile may be received from the external device 108 in response to a user request to save a profile X created for and assigned to the power tool 104 using the techniques described herein (see, e.g., FIGS. 8A-B and 11). At block 454, the server 112 saves the profile X to the tool profile bank 346. The profile is saved with various profile data, such as the type of profile data shown in FIG. 12. The blocks 452 and 454 may be performed a plurality of times to generate a tool profile bank 346 having a plurality of profiles (e.g., tens, hundreds, thousands, or more profiles).

In some instances, the profile sent to the server 112 for saving originates from an administrative device 480. The administrative device 480 may be, for instance, a personal computer or laptop having a web browser 482 that is communicatively coupled to the server 112 via the network 114. For instance, an administrator may navigate to a web server (not shown), which may be part of or separate from the server 112, and that provides a user interface via the web browser 482 for interacting with the tool profile bank 346, tool data 348, and/or permissions and group data 349. The administrator may be, for example, the manufacturer of the tool or a third party, such as a manufacturer of an accessory used by the power tool.

After saving at block 454, or if no profile was received at block 452, the server 112 proceeds to block 456 and determines whether a profile search request has been received. For instance, such a request can be generated by the second external device 446 via the profile search screen 428 as described with respect to FIG. 13. If no request has been received, the server returns to block 452. If a profile search request has been received, at block 458, the search engine 343 of the server 112 searches the tool profile bank 346 and generates search results including a list of one or more profiles meeting search criteria of the search request. At block 460, the search results are sent by the server 112 back to the requesting device. Continuing with the example, the search results include the profile X and the results are sent to the second external device 446 for display, such as shown in FIG. 14.

At block 462, the server 112 receives a user selection from the requesting device (e.g., the second external device 446) in response to a user input, such as by selecting the profile X from the displayed search results. At block 464, the server 112 sends the selected profile back to the requesting device. For instance, the server 112 sends the profile X to the second external device 446. The server 112 may also update the my profiles list (see, e.g., FIG. 9) of the requesting device to associate the profile X with the requesting device. Upon receipt, at block 466, the second external device 446 is operable to assign the profile X to the second power tool 448. The method 450 then proceeds back to block 452. Accordingly, the method 450 and communication system 100 enable an administrator or a first user of a first tool to create a tool profile and to share the tool profile with a second user having a second tool.

Figure 15B:
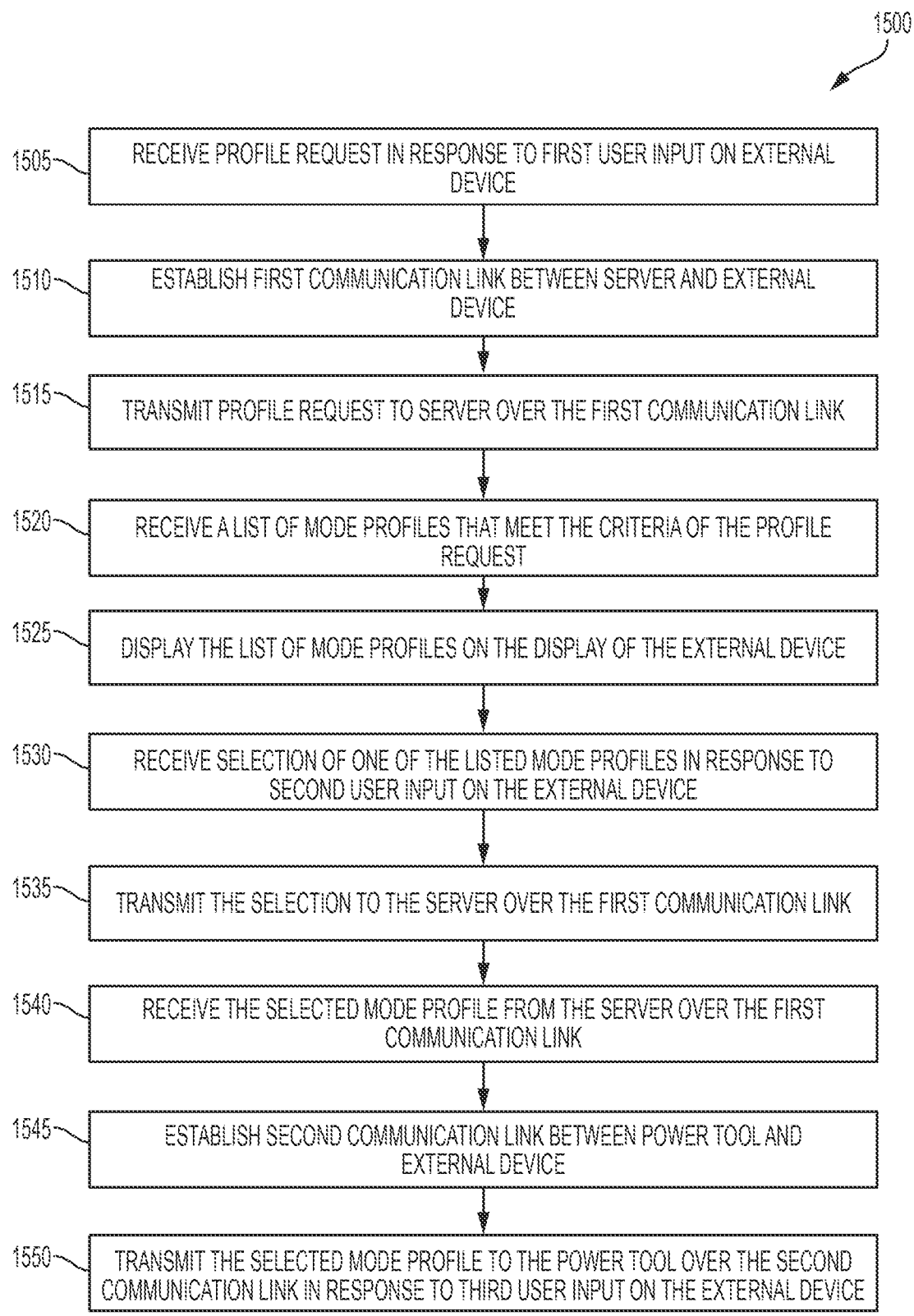

FIG. 15B illustrates a flowchart of an exemplary method 1500 of sharing mode profiles using the communication system 100 from the perspective of the external device 108 according to one embodiment. The method 1500 of FIG. 15B is similar to the method 450 of FIG. 15A. However, the method 1500 is explained from the perspective of the external device 108 unlike the method 450 that was explained from the perspective of the server 112.

Referring to FIG. 15B, at block 1505, the external device 108 receives a profile request in response to a first user input on the external device 108 as described previously herein with respect to block 456 of FIG. 15A. In some embodiments, the profile request includes a profile source indication specifying a profile creator source type for the mode profiles being requested. For example, the filters 432 of FIG. 13, when selected, may provide profile source indications that specify profile creator source types (for example, other users, manufacturers, approved third parties) for the mode profiles being requested. Additionally, the external device 108 may receive a profile request that specifies a profile creator source type by the user selecting one of the tabs 418, 420, 422, and 424 of FIG. 9. For example, selection of the group profiles tab 422 corresponds to a profile request for the mode profiles included within a particular group (in other words, the profile request includes a profile source indication that specifies the members of the particular group as the profile creator source type for the mode profiles being requested). In some embodiments, the profile request may include criteria that includes at least one of a keyword, a profile type, a tool type, a creator name, and a group name (see, for example, FIGS. 9 and 13 and corresponding descriptions above). As mentioned previously herein, in some embodiments, the profile request from the external device 108 of a user may include a profile source indication that includes other users within the profile creator source type for the mode profiles being requested (in other words, in some embodiments, the user is able to use the external device 108 to request and receive mode profiles of other users).

At block 1510, the external device 108 establishes a first communication link with the server 112 using the external wireless communication controller 334. At block 1515, the external device 108 transmits the profile request to the server 112 over the first communication link. At block 1520, the external device 108 receives, from the server 112 over the first communication link, a list of mode profiles that meet the criteria of the profile request. At block 1525, the external device 108 displays the list of mode profiles on the display 332 of the external device 108 (see, for example, search results screen 436 of FIG. 14).

At block 1530, the external device 108 receives a selection of one of the mode profiles from the list of mode profiles in response to a second user input on the external device 108. At block 1535, the external device 108 transmits the selection of the mode profile to the server 112 over the first communication link. At block 1540, the external device 108 receives the selected mode profile from the server 112 over the first communication link. As noted above, in some embodiments, the selected mode profile received by the external device 108 is generated by a different user than the user operating the external device 108.

At block 1545, the external device 108 establishes a second communication link with the power tool 104 using the external wireless communication controller 334. At block 1550, the external device 108 transmits the selected mode profile to the power tool 104 over the second communication link in response to a third user input as described previously herein. Thereafter, the power tool 104 may be configured to operate according to the selected mode profile. In some embodiments, the external device 108 of a first user may establish a communication link with an external device of a second user. In such embodiments, the communication link may be used to transmit and receive mode profiles between the external devices of different users without use of the server 112 (in other words, peer-to-peer sharing of mode profiles created by other users). For example, in some embodiments, such peer-to-peer sharing may occur over a Bluetooth™ network or a near field communication (NFC) network. Additionally, as noted above, in some embodiments, the power tool 104 may relay information received from the external device 108 to one or more additional powers tools. For example, the power tool 104 may relay the mode profile received from the external device 108 to the one or more additional power tools when the one more additional power tools are outside the communication range of the external device 108.

As noted above, the memory 344 of the server 112 includes the permissions and group data 349. The permissions and group data 349 stores information defining users as being either an independent operator or a group member. Independent operators are users that are not assigned to a group. Group members are users that are assigned to a group including two or more users. A group of users may be, for example, all users of a particular company (Bob's Drywall Co.), a set of users for a particular jobsite, or another grouping. Grouping of users together can assist in managing tools and ensuring consistent, proper usage of those tools on particular jobs.

Figure 16:
FIG. 16 illustrates a data table having user group and permission level information.

FIG. 16 illustrates a data table 500 that is an exemplary portion of the permissions and group data 349. The data table 500 lists users with their group information, permission level, and assigned tools. For instance, users A, B, and C all belong to group I; users D, E, F, G, and H belong to group II; and users I and J are independent operators. Further, each user has an associated permission level indicating the particular user's ability to perform certain functions with respect to their associated group. FIG. 17A illustrates an example permissions table 502 listing example permissions levels, including: administrative level, foreman level, operator level, limited operator level, none, and independent operator level. The table 502 also provides example functions that a user is permitted to perform at the various permission levels.

Figure 17B:
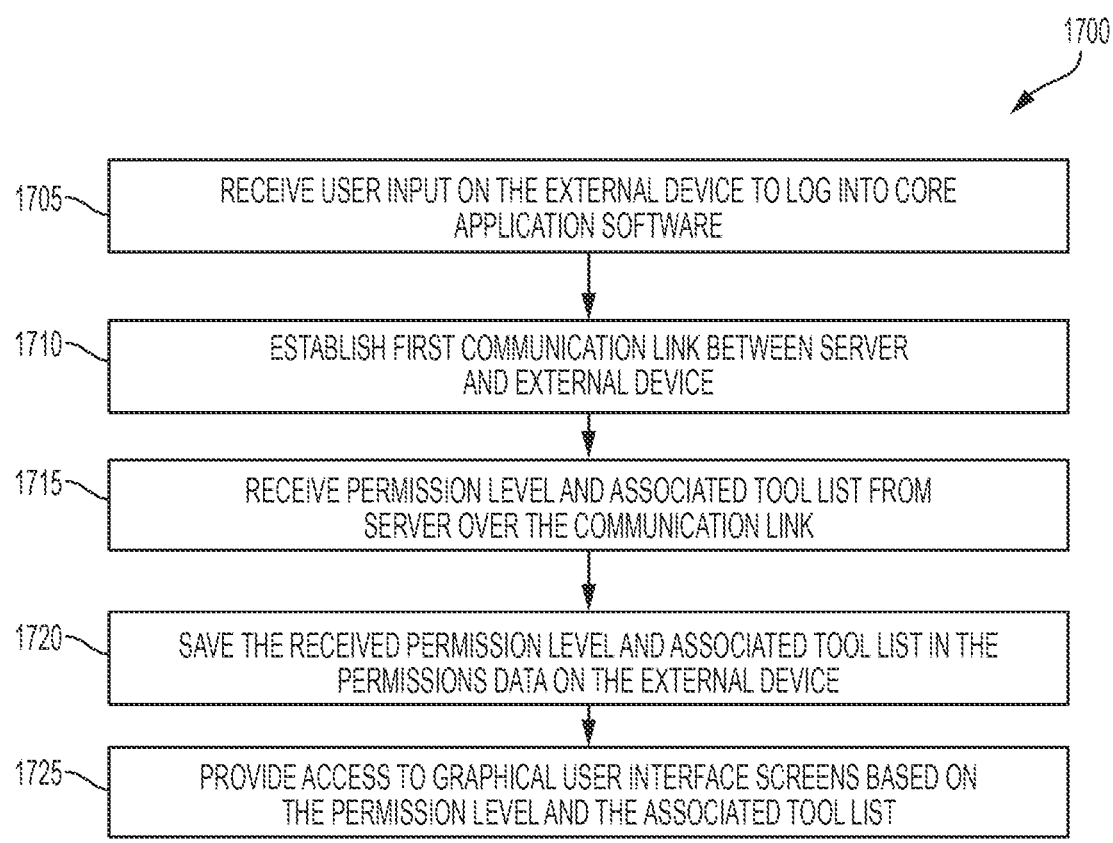
FIG. 17B illustrates a flowchart of an exemplary method of receiving permission levels associated with tools and users on the external device of FIGS. 6-11.

FIG. 17B illustrates a flowchart of an exemplary method 1700 of receiving permission levels associated with tools and users on the external device 108. At block 1705, the external device 108 receives a user input that instructs the device to log into the core application software 312. In response to this user input, at block 1710, the external device 108 establishes a communication link with the server 112 (for example, the external device 108 logs into the core application software 312). At block 1715, the external device 108 receives the permission level and associated tool list associated with the logged-in user from the server 112. At block 1720, the external device 108 saves the received permission level and associated tool list in the permissions data 326 on the external device 108. For instance, upon user A launching the core application software 312 on the external device 108 and signing in as user A with password 1234 (see FIG. 17A), the server 112 provides the external device 108 with the permissions level of the user A (administrative level). At block 1725, the external device 108 then provides the user access to various graphical user interface screens enabling the user A to carry out permitted functions based on the received permission level and associated tool list.

In some embodiments, the graphical user interface screens and permitted functions provided by the external device 108 (at block 725 of FIG. 17B) are based on the permission level of the user. Accordingly, the graphical user interface screens and permitted functions provided by the external device 108 may be based on the permissions listed in table 502 of FIG. 17A. For example, in some embodiments, users with different permission levels may have access to different or additional graphical user interface screens that perform different or additional functions. For instance, in some embodiments, the external device 108 may provide an update group screen that enables the user A to add and remove users to the group I (e.g., by requesting that the server 112 update the table 500). In some embodiments, this update group screen may only be accessible by a user with an administrative permission level. Additionally, a user with a permission level of administrative is operable to adjust the permission levels of the other members (users) of the group, except for other users in the group having the administrative permission level. Users, such as user A, can also use the web browser 482 of the administrative device 480 to update group information and carry out the various permissible functions.

In table 500 (see FIG. 17A), the permission level for a particular user applies to the tools listed in the associated tools column of that user. In some embodiments, the table 500 does not specify particular tools but, rather, the permissions level applies to all tools that the user encounters.

A user with the appropriate permissions (e.g., administrative level or foreman level) is also operable to update mode profiles stored in the tool profile bank 346 for the group to which the user belongs. Accordingly, a foreman at a particular jobsite can ensure that all operators at the jobsite have access to the same, foreman-approved mode profiles. In the case of a user with the lowest permission level ("none"), the foreman is able to assign particular profiles to an associated tool (e.g., crimper 6) and the user G is not able to alter the profile. Accordingly, the foreman can ensure that the user G is using the correct tool settings. Other examples of permitted functions based on the permission level of a user are shown in table 502 of FIG. 17A.

An independent operator may have full permission levels for tools that the operator pairs with using the external device 108 or that have been associated with the operator. However, if one of the power tools 104 has been assigned or associated with a particular group, which may be stored in the memory 344 of the server 112, the independent operator is not able to configure the tool. In other words, the external device 108 of the independent operator determines after communication with the server 112 that the tool is assigned to a particular group to which the independent operator does not belong, and the external device 108 thereafter prevents the independent operator from configuring the tool (e.g., updating profiles on the tool). Accordingly, users may have different permission levels for different power tools and for different groups in which they are members. In some instances, power tools 104 have stored thereon an indication of whether the power tool 104 has been assigned to a particular group or user. In response to receiving this indication from the power tool 104, the external device 108 disables tool configuration options for that tool until the server 112 confirms to the external device 108 that the user is associated with the group or power tool 104.

Figure 18A:
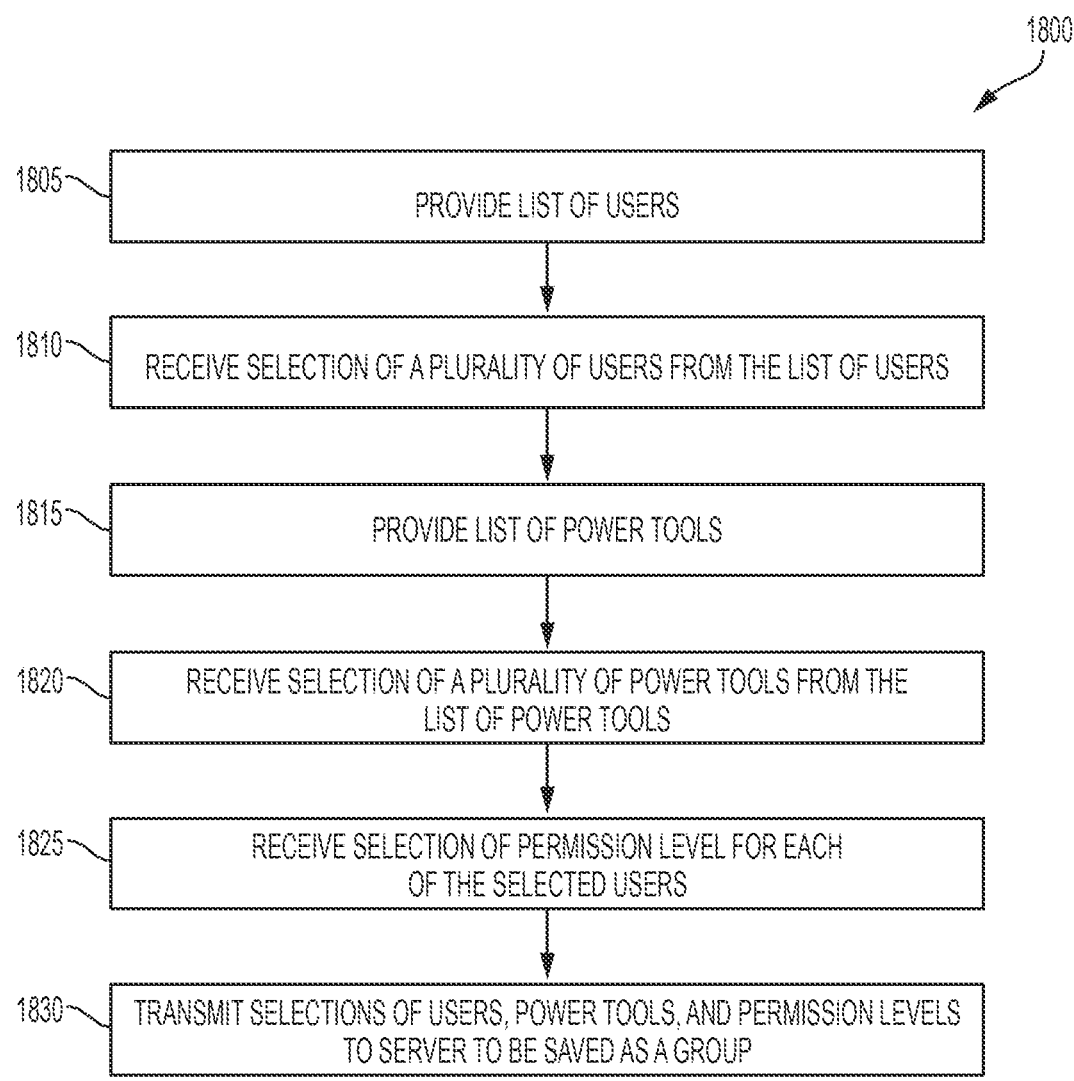
FIG. 18A illustrates a flowchart of an exemplary method of creating a group of users and associated power tools.
Figure 18B:
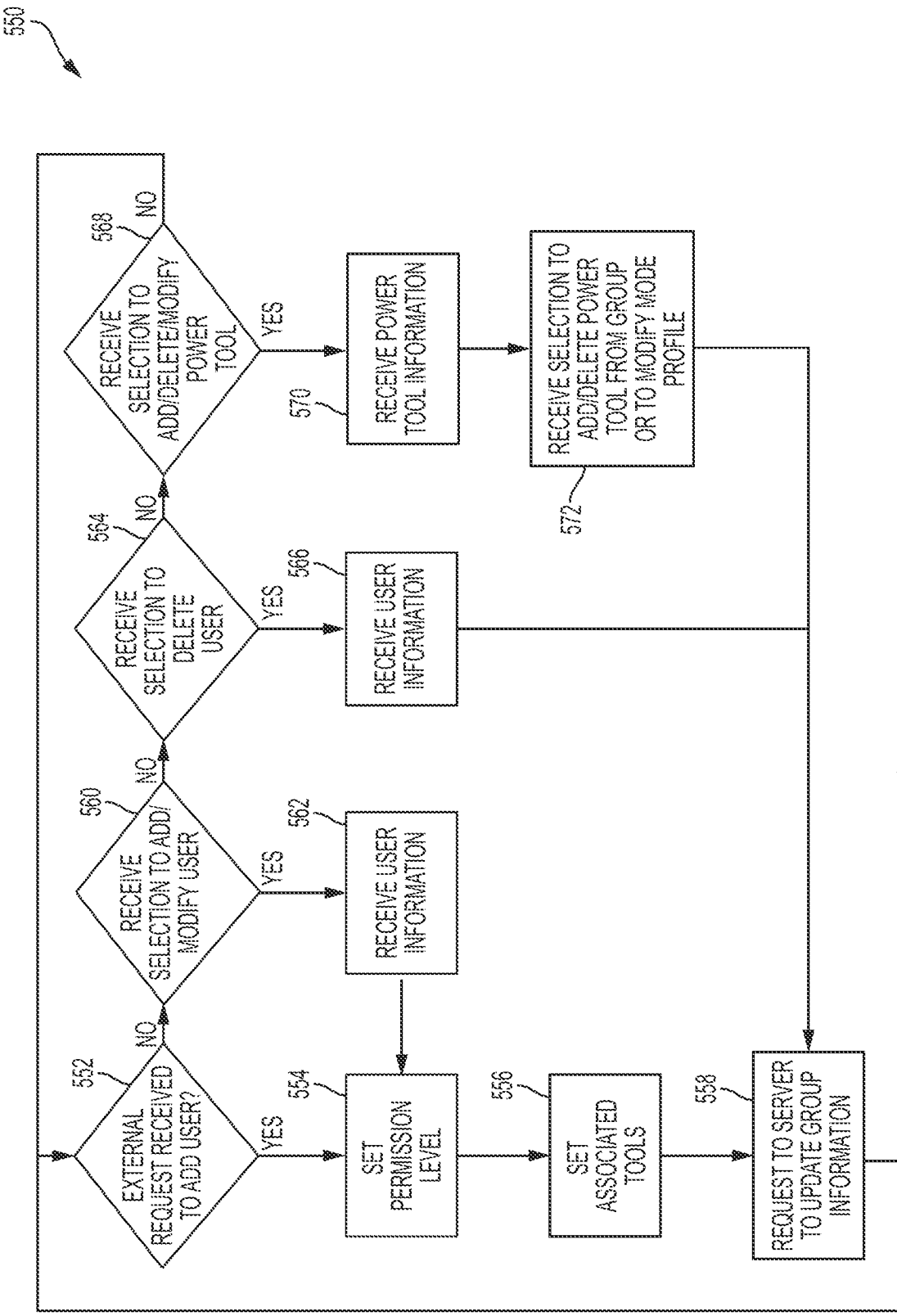
FIG. 18B illustrates a flowchart of an exemplary method for modifying group settings of the group created by the method of FIG. 18A.

FIGS. 18A and 18B respectively illustrate flowcharts of a method 1800 of creating a group of users and a method 550 for modifying group settings of a group of users. The methods 1800 and 550 may be performed by an administrator on the administrative device 480. For example, the web browser 482 of the administrative device 480 may provide the interface for the administrator and may carry out the methods 1800 and 550. In other embodiments, in place of the web browser 482, a dedicated software application may be executed by the administrative device 480 to provide the administrator interface and carry out the methods 1800 and 550. Further still, in some embodiments, the external device 108 is operated by an administrator and carries out the methods 1800 and 550. However, methods 1800 and 550 will be described with respect to the administrative device 480.

FIG. 18A illustrates a flowchart of the method 1800 for creating a group of users and associated power tools. At block 1805, the administrative device 480 provides a list of users for the administrator to select. At block 1810, the administrative device 480 receives a selection of a plurality of users via a user input on the administrative device 480 (in other words, the administrator selects the users that are to be included in the group). At block 1815, the administrative device 480 provides a list of power tools for the administrator to select. At block 1820, the administrative device 480 receives a selection of a plurality of power tools via a user input on the administrative device 480 (in other words, the administrator selects the power tools that are to be included the group). At block 1825, the administrative device 480 receives a permission level for each selected user via user inputs on the administrative device 480. As noted above, in some embodiments, the permission level of each user may be individually set for each power tool or may be set for all power tools included in the group. Additionally, in some embodiments, a default permission level is assigned to each of the selected users. At block 1830, the administrative device 480 transmits the selections of users, power tools, and permission levels to the server 112 to be saved as a group in permissions and group data 349. In some embodiments, blocks 1805 through 1825 are carried out in a different order.

When the server 112 receives the selections of users, power tools, and permission levels from the administrative device 480, the server 112 creates and saves this information as a new group in the permissions and group data 349. Upon a user of the new group logging into the core application software 312 using the external device 108, the server 112 transmits the permission level of the user and a list of the power tools associated with the new group to the external device 108. Additionally, the server 112 responds to search requests in accordance with the information of the new group saved in the permissions and group data 349.

Through the administrative device 480, the administrator may modify the settings of the group (for example, users in the group, permission levels of users, power tools in the group, mode profiles available to be used on power tools of the group, and the like). FIG. 18B illustrates the method 550 for modifying group settings by an administrator of a particular group. For instance, in some embodiments, the administrator operating the administrative device 480 is a user/member of the group having an administrative permission level.

At block 552, the administrative device 480 determines whether an external request to add a user to the group has been received by the administrative device 480. Such a request may be generated by a user (e.g., via the external device 108) and may include user information including a username and the group name to identify the user and the desired group. In some embodiments, if a request has been received, the administrative device 480 may prompt the administrator for a user input to indicate whether the new user is allowed to enter the group. In such embodiments, when the user input received from the administrator by the administrative device 480 indicates that the new user is not allowed in the group, the method 550 proceeds back to block 552 and does not add the new user to the group. Alternatively, when the user input received from the administrator by the administrative device 480 indicates that the new user is allowed in the group, the method 550 proceeds to block 554 where the new user's permission level is set. For instance, the administrative device 480 provides a graphical user interface screen identifying the user and providing available permission levels (e.g., as a drop down list), which enables the administrator to select the desired permission level for the new user.

At block 556, the administrative device 480 adds one or more tools as the associated tools of the new user. For instance, the administrative device 480 provides a graphical user interface screen identifying the user and providing a list of the associated tools of the administrator, which enables the administrator to select the desired tools for the new user. At block 558, the administrative device 480 sends a request to the server 112 to update the permissions and group data 349 by adding the new user with the selected permission levels and the associated tools. The method 550 then returns to block 552. In some embodiments, blocks 554, 556, and 558 are carried out in a different order. For instance, the administrative device 480 may first add the user to the group (block 558) with default settings, and then proceed to blocks 554 and 556 to update permission levels and associated tools.

If, at block 552, an external request to add a new user is not received, the administrative device 480 determines whether it has received a selection (i.e., a user input) from the administrator, via the web browser 482, for example, to add a user to the group or to modify settings of a user that is already a member of the group. For example, such a selection may be made to adjust the permission level associated with a user. If such a selection has been received, the administrative device 480 receives user information (e.g., input via a graphical user interface) identifying the particular user at block 560. In some instances, blocks 560 and 562 occur simultaneously (i.e., the selection received at block 560 includes the user information). Thereafter, the administrator is able to set or update permission levels associated with the particular user at block 554 and set or update tools associated with the particular user at block 556 as described above. At block 558, the administrative device 480 sends a request to the server 112 to update the permissions and group data 349 by adding the user or modifying the user data as specified at blocks 554 and 556. The method 550 then returns to block 552.

If no selection to add a user or modify settings of a user was received at block 560, the administrative device 480 determines whether a selection to delete a user from the group has been received at block 564. If such a selection has been received, the administrative device 480 receives user information identifying the particular user at block 566. In some embodiments, blocks 564 and 566 occur simultaneously (i.e., the selection received at block 564 includes the user information). At block 558, the administrative device 480 sends a request to the server 112 to update the permissions and group data 349 to delete the specified user's affiliation with the group and to set the user as an independent operator. The method 550 then returns to block 552.

If no selection to delete a user was received at block 564, the administrative device 480 determines whether a selection to add, delete, or modify a power tool from the group has been received at block 568. If no such selection has been received, the method 550 returns to block 552. If such a selection has been received, the administrative device 480 receives power tool information identifying the particular power tool at block 570. In some embodiments, blocks 568 and 570 occur simultaneously (i.e., the selection received at block 568 includes the power tool information). At block 572, the administrative device 480 receives a selection to add, delete, or modify settings associated with the selected power tool. For example, the selection may indicate to add a power tool to the group or deleting a power tool from the group. Additionally, in some embodiments, an administrator may modify settings of a power tool by selecting a mode profile of the power tool and adjusting parameters of the mode profile as explained previously herein. At block 558, the administrative device 480 sends a request to the server 112 to update the permissions and group data 349 to add the specified power tool to the group, delete the specified power tool's affiliation with the group, or modify the settings of the specified power tool. The method then returns to block 552.

In some embodiments, the administrative device 480 allows for a mode profile for multiple power tools to be modified simultaneously. For example, in some embodiments, at block 570 of FIG. 18B, the administrative device 480 may receive power tool information that relates to a plurality of power tools or a type of power tool (for example, all impact drivers within a group). Alternatively, in some embodiments, the administrative device 480 may receive a selection of the mode profile and may allow for modification of the mode profile such that power tools that are configured to operate using the mode profile receive the modified mode profile the next time the power tools form a communication link with the external device 108 to be configured.

Accordingly, FIG. 18B provides a method that may be performed by an administrative device 480 to configure group permissions and group data. The method includes receiving an administrative request via a user input on the administrative device 480 (for example, see blocks 552, 560, 564, and 568 of FIG. 18B). The method further includes receiving administrative configuration data via user input on the administrative device 480 (for example, see block 554, 556, 562, 566, 570, and 572 of FIG. 18B). The method further includes transmitting a request to the server 112 based on the administrative request and the administrative configuration data.

When the server 112 receives the request from the administrative device 480 (at block 558 of FIG. 18B), the server 112 updates the permissions and group data 349 accordingly. Upon a user of the group logging into the core application software 312 using the external device 108, the server 112 transmits updated group information to the external device 108. Additionally, the server 112 responds to search requests (see, for example, FIG. 15A) in accordance with the updated information of the group saved in the permissions and group data 349.

In some embodiments, a method that may be performed by a first external device of a first user is provided. The method includes receiving, via a user input on the first external device, a request to share a mode profile with a second external device. The method further includes establishing a communication link with the second external device and transmitting the mode profile to the second external device over the communication link. After receiving the mode profile from the first external device, the second external device 108 establishes a second communication link with a power tool and transmits the received mode profile to the power tool over the second communication link. Thereafter, the power tool may be configured to operate according to the received mode profile.

In some embodiments, a method that may be performed by a server is provided. The method includes receiving a first profile request with a first group identifier from a first external device. The method further includes transmitting a first list of a first plurality of mode profiles based on the first group identifier to the first external device in response to the first profile request. The method further includes receiving a second profile request with a second group identifier from a second external device. The method further includes transmitting a second list of a second plurality of mode profiles based on the second group identifier to the second external device in response to the second profile request. Additionally, the server may receive selections from one or both of the first external device and the second external device of a mode profile on the respective received lists. In response to such selections, the server transmits the respective selected mode profile to the one or both of the first external device and the second external device. The first and second external devices may then transmit the respective selected mode profile to a respective power tool, which is configured to operate according to the respective selected mode profile.

In some embodiments, a method that may be performed by an administrative device is provided. The method includes providing a list of users on a display of the administrative device. The method further includes receiving, via user input on the administrative device, a selection of a plurality of users from the list of users. The method further includes providing a list of power tools on the display of the administrative device. The method further includes receiving, via user input on the administrative device, a selection of a plurality of power tools from the list of power tools. The method further includes receiving, via user input on the administrative device, a selection of a permission level for each of the selected users. The method further includes transmitting the selections of the users, the power tools, and the permission levels to a server to be saved as a group.

When the server receives the selections from the administrative device, the server updates permissions and group data accordingly. Upon a user of the group logging into core application software using an external device, the server transmits updated group information to the external device. Additionally, the server responds to search requests (see, for example, FIG. 15A) in accordance with the updated information of the group saved in the permissions and group data.

Thus, the invention provides, among other things, a power tool communication system that permits sharing of mode profiles among users and third parties, provides user groupings, and sets permission levels for tool and group configuration.

What is claimed is:

1. An external device configured to program a power tool, the external device comprising:
an external wireless communication controller;
a display; and
an electronic processor communicatively coupled to the external wireless communication controller and to the display, wherein the electronic processor is configured to:
control the display to display a nearby devices screen that indicates a plurality of power tools configured to communicate with the external device,
receive a first user input selecting the power tool from among the plurality of power tools listed on the nearby devices screen,
control, in response to receiving the first user input selecting the power tool, the display of the external device to display a tool interface for the power tool,
receive a second user input selecting a profile setup icon on the tool interface for the power tool,
control, in response to receiving the second user input selecting the profile setup icon, the display of the external device to display a profile list screen of mode profiles that are compatible with the power tool,
receive a third user input to request additional mode profiles,
control, in response to receiving the third user input, the display to display a mode profile search screen,
receive a keyword entered by a user via a fourth user input,
establish, with the external wireless communication controller, a first communication link with a server, the server including a profile bank that includes mode profiles, each of the mode profiles included in the profile bank including power tool configuration data,
transmit, with the external wireless communication controller, the keyword to the server, wherein the keyword is used by the server to search names of the mode profiles included in the profile bank,
receive, with the external wireless communication controller, a list of a first plurality of mode profiles whose name includes the keyword,
control the display to display the names of the first plurality of mode profiles on the profile list screen,
receive, via a fifth user input, a selection of one of the mode profiles of the first plurality of mode profiles,
in response to receiving the fifth user input, request power tool configuration data included in the selected one of the mode profiles from the server,
receive, with the external wireless communication controller and from the server, the power tool configuration data included in the selected one of the mode profiles, and
transmit, with the external wireless communication controller, the power tool configuration data included in the selected one of the mode profiles to the power tool to configure performance of operation of a motor of the power tool;
wherein the first plurality of mode profiles each include a first share level that allows the first plurality of mode profiles to be discoverable by the external device of the user; and
wherein the profile bank includes a second plurality of mode profiles that each include a second share level different than the first share level, wherein the second share level prevents the second plurality of mode profiles from being discoverable by the external device of the user regardless of whether names of the second plurality of mode profiles include the keyword.

2. The external device of claim 1, wherein each mode profile of the first plurality of mode profiles was created by an entity besides the user; and
wherein the entity includes at least one of the group consisting of another user, a manufacturer of the power tool, a member of a group to which the user belongs, and combinations thereof.

3. The external device of claim 1, wherein the electronic processor is configured to receive a sixth user input that indicates a source of the mode profiles of the profile bank that are to be searched using the keyword; and
wherein the source of the mode profiles includes at least one of the group consisting of user-generated mode profiles, manufacturer generated mode profiles, approved third-party generated mode profiles, and combinations thereof.

4. The external device of claim 1, wherein the electronic processor is configured to receive a sixth user input that indicates one of a plurality of categorizations of the first plurality of mode profiles, wherein a subset of the first plurality of mode profiles is displayed on the display based on the sixth user input that indicates the one of the plurality of categorizations; and
wherein the plurality of categorizations include at least two selected from the group consisting of user profiles of the user, group profiles of a group of users to which the user belongs, all profiles associated with the user and the group of users to which the user belongs, default profiles, and combinations thereof.

5. The external device of claim 1, wherein the electronic processor is configured to transmit a group identifier to the server, wherein the group identifier specifies mode profiles associated with a group of entities; and
wherein the list of the first plurality of mode profiles received corresponds to the mode profiles associated with the group of entities.

6. The external device of claim 1, wherein the electronic processor is configured to control the display to display at least one of a rating indicator, a popularity indicator, and a combination thereof corresponding to each of the names of the first plurality of mode profiles displayed on the display.

7. The external device of claim 1, wherein the electronic processor is configured to:
control the display to display the power tool configuration data included in the selected one of the mode profiles;
receive a sixth user input that adjusts a value of a parameter included in the power tool configuration data included in the selected one of the mode profiles to create a modified mode profile; and
transmit, with the external wireless communication controller, power tool configuration data included in the modified mode profile to the power tool to configure the performance of operation of the motor of the power tool.

8. A method of programming a power tool from an external device, the method comprising:
controlling, with an electronic processor of the external device, a display of the external device to display a nearby devices screen that indicates a plurality of power tools configured to communicate with the external device;

receiving, with the electronic processor, a first user input selecting the power tool from among the plurality of power tools listed on the nearby devices screen;

controlling, with the electronic processor and in response to receiving the first user input selecting the power tool, the display of the external device to display a tool interface for the power tool;

receiving, with the electronic processor, a second user input selecting a profile setup icon on the tool interface for the power tool;

controlling, with the electronic processor and in response to receiving the second user input selecting the profile setup icon, the display of the external device to display a profile list screen of mode profiles that are compatible with the power tool;

receiving, with the electronic processor, a third user input to request additional mode profiles;

controlling, with the electronic processor and in response to receiving the third user input, the display of the external device to display a mode profile search screen;

receiving, with the electronic processor, a keyword entered by a user via a fourth user input;

establishing, with an external wireless communication controller of the external device, a first communication link with a server, the server including a profile bank that includes mode profiles, each of the mode profiles included in the profile bank including power tool configuration data;

transmitting, with the external wireless communication controller, the keyword to the server, wherein the keyword is used by the server to search names of the mode profiles included in the profile bank;

receiving, with the external wireless communication controller, a list of a first plurality of mode profiles whose name includes the keyword;

controlling, with the electronic processor, the display to display the names of the first plurality of mode profiles on the profile list screen;

receiving, with the electronic processor via a fifth user input, a selection of one of the mode profiles of the first plurality of mode profiles;

in response to receiving the fifth user input, requesting, with the electronic processor via the external wireless communication controller, power tool configuration data included in the selected one of the mode profiles from the server;

receiving, with the electronic processor via the external wireless communication controller and from the server, the power tool configuration data included in the selected one of the mode profiles; and transmitting, with the electronic processor via the external wireless communication controller, the power tool configuration data included in the selected one of the mode profiles to the power tool to configure performance of operation of a motor of the power tool.

9. The method of claim 8, wherein the first plurality of mode profiles each include a first share level that allows the first plurality of mode profiles to be discoverable by the external device of the user; and wherein the profile bank includes a second plurality of mode profiles that each include a second share level different than the first share level, wherein the second share level prevents the second plurality of mode profiles from being discoverable by the external device of the user regardless of whether names of the second plurality of mode profiles include the keyword.

10. The method of claim 8, wherein each mode profile of the first plurality of mode profiles was created by an entity besides the user; and wherein the entity includes at least one of the group consisting of another user, a manufacturer of the power tool, a member of a group to which the user belongs, and combinations thereof.

11. The method of claim 8, further comprising receiving, with the electronic processor, a sixth user input that indicates a source of the mode profiles of the profile bank that are to be searched using the keyword; and wherein the source of the mode profiles of the profile bank that are to be searched includes at least one of the group consisting of user-generated mode profiles, manufacturer generated mode profiles, approved third-party generated mode profiles, and combinations thereof.

12. The method of claim 8, further comprising receiving, with the electronic processor, a sixth user input that indicates one of a plurality of categorizations of the first plurality of mode profiles, wherein a subset of the first plurality of mode profiles is displayed on the display based on the sixth user input that indicates the one of the plurality of categorizations; and wherein the plurality of categorizations include at least two selected from the group consisting of user profiles of the user, group profiles of a group of users to which the user belongs, all profiles associated with the user and the group of users to which the user belongs, default profiles, and combinations thereof.

13. The method of claim 8, further comprising transmitting, with the electronic processor via the external wireless communication controller, a group identifier to the server, wherein the group identifier specifies mode profiles associated with a group of entities; and wherein the list of the first plurality of mode profiles received corresponds to the mode profiles associated with the group of entities.

14. The method of claim 8, further comprising:
controlling, with the electronic processor, the display to display the power tool configuration data included in the selected one of the mode profiles;

receiving, with the electronic processor, a sixth user input that adjusts a value of a parameter included in the power tool configuration data included in the selected one of the mode profiles to create a modified mode profile; and transmitting, with the electronic processor via the external wireless communication controller, power tool configuration data included in the modified mode profile to the power tool to configure the performance of operation of the motor of the power tool.

15. A method of programming a power tool from an external device, the method comprising:
controlling, with an electronic processor of a first external device, a display of the first external device to display a nearby devices screen that indicates a plurality of power tools configured to communicate with the external device;

receiving, with the electronic processor, a first user input selecting the power tool from among the plurality of power tools listed on the nearby devices screen;

controlling, with the electronic processor and in response to receiving the first user input selecting the power tool, the display of the first external device to display a tool interface for the power tool;

receiving, with the electronic processor, a second user input selecting a profile setup icon on the tool interface for the power tool;

controlling, with the electronic processor and in response to receiving the second user input selecting the profile setup icon, the display of the first external device to display a profile list screen of mode profiles that are compatible with the power tool, wherein each of the mode profiles includes power tool configuration data operable to control a first motor of a first power tool of a first user, wherein at least some of the power tool configuration data was set by the first user;

receiving, with the electronic processor of the first external device via a third user input from the first user on the first external device, a selection of a first mode profile from the mode profiles;

receiving, with the electronic processor via a fourth user input from the first user, a share request; and transmitting, with an external wireless communication controller of the first external device to a second external device of a second user different than the first user via a peer-to-peer communication link without using a server, power tool configuration data of the first mode profile in response to receiving (i) the selection of the first mode profile and (ii) the share request, wherein the power tool configuration data of the first mode profile is operable to control a second motor of a second power tool of the second user by the second external device transmitting the power tool configuration data of the first mode profile to the second power tool.

16. The method of claim 15, wherein the first power tool and the second power tool are the same type of power tool.

17. The method of claim 15, wherein when the second motor of the second power tool is enabled in response to a trigger pull, operation of the second motor is controlled based on at least some of the power tool configuration data of the first mode profile while the second motor continues to be enabled.

18. The method of claim 15, further comprising:

establishing, with the external wireless communication controller of the first external device, a second communication link with a server, the server including a profile bank that includes mode profiles generated by a plurality of users;

receiving, with the external wireless communication controller of the first external device, a second mode profile from the server, the second mode profile having been generated by an entity different from the first user and the second user and having been previously saved in the profile bank of the server;

displaying, on the display of the first external device, power tool configuration data of the second mode profile; and receiving, with the electronic processor via a third user input from the first user, an adjustment of a value of a parameter included in the power tool configuration data of the second mode profile to create the first mode profile that includes the power tool configuration data of the first mode profile.

* * * * *